United States Patent
Yasui et al.

(10) Patent No.: US 10,704,132 B2
(45) Date of Patent: Jul. 7, 2020

(54) HIGH-STRENGTH HOT-DIP GALVANIZED STEEL SHEET EXCELLENT IN IMPACT PEELING RESISTANCE AND WORKED PORTION CORROSION RESISTANCE

(71) Applicant: NIPPON STEEL & SUMITOMO METAL CORPORATION, Tokyo (JP)

(72) Inventors: Takeshi Yasui, Tokyo (JP); Hiroyuki Kawata, Tokyo (JP); Yuji Yamaguchi, Tokyo (JP); Ryosuke Komami, Tokyo (JP); Satoshi Uchida, Tokyo (JP); Akinobu Murasato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 81 days.

(21) Appl. No.: 16/060,331

(22) PCT Filed: Feb. 25, 2016

(86) PCT No.: PCT/JP2016/055635
§ 371 (c)(1),
(2) Date: Jun. 7, 2018

(87) PCT Pub. No.: WO2017/145329
PCT Pub. Date: Aug. 31, 2017

(65) Prior Publication Data
US 2018/0312954 A1 Nov. 1, 2018

(51) Int. Cl.
*C23C 2/06* (2006.01)
*C23C 2/02* (2006.01)
(Continued)

(52) U.S. Cl.
CPC ............... *C23C 2/06* (2013.01); *B32B 15/01* (2013.01); *B32B 15/013* (2013.01); *B32B 15/04* (2013.01);
(Continued)

(58) Field of Classification Search
CPC ..... C23C 2/06; C23C 2/26; C23C 2/40; C23C 2/28; C23C 2/02; C23C 2/00; C23C 2/04;
(Continued)

(56) References Cited

U.S. PATENT DOCUMENTS

| 10,351,936 B2 | 7/2019 | Sato et al. |
| 2010/0304183 A1 | 12/2010 | Honda et al. |

(Continued)

FOREIGN PATENT DOCUMENTS

| CN | 103842543 A | 6/2014 |
| CN | 103857814 A | 6/2014 |

(Continued)

OTHER PUBLICATIONS

Extended European Search Report dated Apr. 5, 2019, in European Patent Application No. 16891486.9.

(Continued)

*Primary Examiner* — Michael E. La Villa
(74) *Attorney, Agent, or Firm* — Birch, Stewart, Kolasch & Birch, LLP

(57) ABSTRACT

A high-strength hot-dip galvanized steel sheet excellent in impact resistance and worked portion corrosion resistance including a hot-dip galvanized plating layer on a steel sheet base material whose tensile strength is 590 MPa or more, wherein the plating layer includes projecting alloy layers being in contact with the steel sheet base material, a number density of the projecting alloy layers is 4 pieces/mm or more, wherein the steel sheet base material includes: a miniaturized layer being directly in contact with the interface between the steel sheet base material and the plating layer; a decarburized layer being in contact with the miniaturized layer; and an inner layer other than the miniaturized layer and the decarburized layer, and one or more kinds of oxides of Si and Mn are contained in layers of the (Continued)

miniaturized layer, the decarburized layer, and the projecting alloy layers.

8 Claims, 1 Drawing Sheet

(51) Int. Cl.

| | |
|---|---|
| C23C 2/28 | (2006.01) |
| C23C 2/40 | (2006.01) |
| C21D 9/46 | (2006.01) |
| C21D 8/02 | (2006.01) |
| C21D 6/00 | (2006.01) |
| C22C 38/28 | (2006.01) |
| C22C 38/22 | (2006.01) |
| C22C 38/16 | (2006.01) |
| C22C 38/08 | (2006.01) |
| C22C 38/14 | (2006.01) |
| C22C 38/12 | (2006.01) |
| C22C 38/06 | (2006.01) |
| C22C 38/04 | (2006.01) |
| C22C 38/02 | (2006.01) |
| C22C 38/00 | (2006.01) |
| C22C 38/38 | (2006.01) |
| C23C 2/26 | (2006.01) |
| C23C 2/00 | (2006.01) |
| C23C 28/02 | (2006.01) |
| C23C 30/00 | (2006.01) |
| C23C 2/04 | (2006.01) |
| B32B 15/04 | (2006.01) |
| B32B 15/01 | (2006.01) |
| B32B 15/18 | (2006.01) |
| C22C 38/18 | (2006.01) |
| C22C 38/40 | (2006.01) |
| C22C 38/48 | (2006.01) |
| C22C 18/00 | (2006.01) |
| C22C 38/20 | (2006.01) |
| C22C 38/44 | (2006.01) |
| C22C 38/50 | (2006.01) |
| C22C 38/42 | (2006.01) |
| C22C 38/54 | (2006.01) |
| C22C 38/26 | (2006.01) |
| C22C 38/58 | (2006.01) |
| C22C 38/32 | (2006.01) |
| C22C 38/34 | (2006.01) |
| C23G 1/00 | (2006.01) |

(52) U.S. Cl.
CPC ............ *B32B 15/043* (2013.01); *B32B 15/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 18/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/48* (2013.01); *C22C 38/50* (2013.01); *C22C 38/54* (2013.01); *C22C 38/58* (2013.01); *C23C 2/00* (2013.01); *C23C 2/02* (2013.01); *C23C 2/04* (2013.01); *C23C 2/26* (2013.01); *C23C 2/28* (2013.01); *C23C 2/40* (2013.01); *C23C 28/023* (2013.01); *C23C 28/025* (2013.01); *C23C 30/00* (2013.01); *C23C 30/005* (2013.01); *C23G 1/00* (2013.01); *Y10T 428/12792* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/2495* (2015.01); *Y10T 428/24942* (2015.01); *Y10T 428/24967* (2015.01); *Y10T 428/24975* (2015.01); *Y10T 428/24983* (2015.01); *Y10T 428/26* (2015.01); *Y10T 428/263* (2015.01); *Y10T 428/264* (2015.01); *Y10T 428/265* (2015.01); *Y10T 428/2949* (2015.01)

(58) Field of Classification Search
CPC ..... C23C 30/00; C23C 30/005; C23C 28/023; C23C 28/025; C22C 38/38; C22C 38/28; C22C 38/22; C22C 38/16; C22C 38/14; C22C 38/12; C22C 38/08; C22C 38/04; C22C 38/02; C22C 38/002; C22C 38/001; C22C 38/06; C22C 38/18; C22C 38/20; C22C 38/26; C22C 38/32; C22C 38/34; C22C 38/40; C22C 38/42; C22C 38/44; C22C 38/48; C22C 38/50; C22C 38/54; C22C 38/58; C22C 18/00; C21D 8/0278; C21D 8/0263; C21D 8/0236; C21D 8/0226; C21D 8/0205; C21D 6/008; C21D 6/005; C21D 6/002; C21D 6/001; C21D 9/46; C23G 1/00; B32B 15/01; B32B 15/013; B32B 15/04; B32B 15/043; B32B 15/18; Y10T 428/12792; Y10T 428/12799; Y10T 428/12958; Y10T 428/12972; Y10T 428/12979; Y10T 428/12951; Y10T 428/24942; Y10T 428/2949; Y10T 428/24967; Y10T 428/24975; Y10T 428/24983; Y10T 428/26; Y10T 428/263; Y10T 428/264; Y10T 428/265; Y10T 428/2495
See application file for complete search history.

(56) References Cited

U.S. PATENT DOCUMENTS

| | | | |
|---|---|---|---|
| 2014/0212684 | A1 | 7/2014 | Kawata et al. |
| 2014/0227555 | A1 | 8/2014 | Kawata et al. |
| 2014/0234659 | A1 | 8/2014 | Kawata et al. |
| 2014/0287263 | A1 | 9/2014 | Kawata et al. |
| 2016/0017452 | A1* | 1/2016 | Puerta Velasquez ... C22C 38/06 148/531 |

FOREIGN PATENT DOCUMENTS

| | | |
|---|---|---|
| EP | 2 738 280 A1 | 2/2014 |
| JP | 4-276057 A | 10/1992 |
| JP | 5-59429 A | 3/1993 |
| JP | 6-299314 A | 10/1994 |
| JP | 2002-167656 A | 6/2002 |
| JP | 2003-105514 A | 4/2003 |
| JP | 2004-124187 A | 4/2004 |
| JP | 2007-211279 A | 8/2007 |
| JP | 2011-111675 A | 6/2011 |
| JP | 2011-127216 A | 6/2011 |
| JP | 4718782 B2 | 7/2011 |

(56) References Cited

FOREIGN PATENT DOCUMENTS

| | | |
|---|---|---|
| JP | 2012-251229 A | 12/2012 |
| WO | WO 2013/047755 A1 | 4/2013 |
| WO | WO 2013/047760 A1 | 4/2013 |
| WO | WO 2013/154184 A1 | 10/2013 |
| WO | WO 2014/038759 A1 | 3/2014 |

OTHER PUBLICATIONS

Indian Office Action, dated Jul. 19, 2019, for Indian Application No. 201817024099, along with an English translation.
International Search Report for PCT/JP2016/055635 dated May 24, 2016.
Office Action for TW 105105694 dated Sep. 29, 2016.
Written Opinion of the International Searching Authority for PCT/JP2016/055635 (PCT/ISA/237) dated May 24, 2016.
English translation of Written Opinion of the International Searching Authority for PCT/JP2016/055635 (PCT/ISA/237) dated May 24, 2016.
Chinese Office Action and Search Report, dated Sep. 29, 2019, for Chinese Application No. 201680082185.2.
Brazilian Office Action and Search report dated Feb. 18, 2020, for corresponding Brazilian Application No. 112018012606-3, with partial translation.

* cited by examiner

| COMPARATIVE EXAMPLE | EXAMPLE OF PRESENT INVENTION | |
|---|---|---|
| ESTIMATED TO CORRESPOND TO No. 8 OF EXAMPLE | ESTIMATED TO CORRESPOND TO No. 13 OF EXAMPLE | |
| | | 10μm |

HIGH-STRENGTH HOT-DIP GALVANIZED STEEL SHEET EXCELLENT IN IMPACT PEELING RESISTANCE AND WORKED PORTION CORROSION RESISTANCE

TECHNICAL FIELD

The present invention relates to a high-strength hot-dip galvanized steel sheet, and in more detail, relates to a plated steel sheet applicable for various purposes, for example, for an automotive strengthening member as a high-strength hot-dip galvanized steel sheet excellent in impact resistance and plating adhesiveness.

BACKGROUND ART

A hot-dip galvanized steel sheet has been frequently used for automobiles, home electric appliances, building materials, and the like. Extremely high formability is required for an automotive steel sheet which is pressed into complicated shapes. In addition, since a demand for rust-proof performance of the automobile increases in recent years, the hot-dip galvanized steel sheet comes to be often used for the automotive steel sheet.

In recent years, there are increasing needs for a high-strength steel sheet excellent in strength and ductility in view of reduction in vehicle body weight. For example, Patent Document 1 discloses a steel sheet having a steel sheet structure where a ferrite phase, a bainite phase, and an austenite phase are mixed. In addition, it is disclosed that this steel sheet is a steel sheet making use of transformation-induced plasticity exerting high ductility by the transformation of retained austenite into martensite at a forming time.

This type of steel sheet contains, for example, 0.05 to 0.4 mass % of C, 0.2 to 3.0 mass % of Si, and 0.1 to 2.5 mass % of Mn, and forms a complex structure by controlling a temperature pattern during a cooling process after annealing at a two-phase region. There is a characteristic that desired properties can be secured without using expensive alloying elements. In recent years, there are increasing needs for a high-strength hot-dip galvanized steel sheet where a steel sheet base material surface is subjected to hot-dip galvanized plating in order to secure the rust-proof performance even for the aforementioned high-strength steel sheet.

There are increasing cases where the high-strength steel sheet is used not only as a strengthening member for an inner plate use but also as an outer surface member which may receive impact from flying stones or obstacles at a vehicle body driving time. When the high-strength steel sheet is applied to a complicated shaped member, high processability is required. The high-strength hot-dip galvanized steel sheet is required to secure high plating adhesiveness evaluated by severe evaluation methods such as a ball impact test and a draw bead test in addition to a normal 60° V bending test assuming cases when impacts from flying stones or obstacles are received during driving and the plating adhesiveness at a hard working time.

Since cracks occur at plating and a base iron regarding a portion receiving extremely severe working such as a 180° bending work vertex part, corrosion is likely to occur from the portion even after it is subjected to a conversion treatment and an electrodeposition coating. Even a slight corrosion may cause hydrogen penetration from the corroded part to thereby increase a possibility of hydrogen embrittlement cracking particularly when the base material is the high-strength steel sheet.

When the high-strength steel sheet is subjected to galvanized plating at a continuous hot-dip galvanizing facility, plating wettability largely decreases when an Si amount of the steel sheet exceeds 0.3 mass %. There is therefore a problem that unplating occurs to deteriorate an appearance quality in case of a Sendzimir method using a normal Al containing plating bath. In addition, the plating adhesiveness at the impact time or hard working time was difficult to be secured because the plating adhesiveness is simultaneously largely lowered.

It is said that this is because an external oxide film which contains oxides containing Si and Mn having low wettability with respect to molten Zn is generated at a steel sheet surface at a reduction annealing time.

As a means to solve this problem, Patent Document 2 proposes a method where the steel sheet is previously heated in an atmosphere at an air ratio of 0.9 to 1.2 to generate Fe oxide, and then plating is performed in a bath where Mn and Al are added after a thickness of the oxide is set to 500 Å or less in a reduction zone containing $H_2$. However, there have been problems that it is difficult to accurately control the thickness of the oxide, and a manufacturing conditional range in an actual machine is narrow because various steel sheets containing various additive elements are passed through an actual line. Further, though an effect of improving wettability and plating adhesiveness at a normal working time could be expected, an effect of improving the plating adhesiveness at the impact time or hard working time was small.

Patent Document 3 discloses a method improving the platability by supplying specific plating to a lower layer as another unplating suppression means. However, this method requires to newly provide a plating facility at a previous stage of an annealing furnace in a hot-dip plating line, or previously perform a plating treatment in an electroplating line. Both cases cause serious increase in manufacturing cost. Further, the effects of improving the plating adhesiveness at the impact time or hard working time and the worked portion corrosion resistance were small.

Meanwhile, Patent Document 4 discloses a method manufacturing a hot-dip galvanized steel sheet without oxidizing Fe in the steel sheet by adjusting an oxygen potential in an annealing atmosphere at the annealing time. In this method, easily oxidizable elements such as Si and Mn in the steel are internally oxidized by controlling the oxygen potential of the atmosphere to suppress formation of an external oxide film, to thereby improve the platability. Although sufficient adhesiveness can be secured at the normal working time by applying this method, the effects of improving the plating adhesiveness at the impact time or hard working time and the worked portion corrosion resistance could not be expected.

PRIOR ART DOCUMENT

Patent Document

Patent Document 1: Japanese Laid-open Patent Publication No. H05-59429
Patent Document 2: Japanese Laid-open Patent Publication No. H04-276057
Patent Document 3: Japanese Laid-open Patent Publication No. 2003-105514
Patent Document 4: Japanese Patent Publication No. 4718782

DISCLOSURE OF THE INVENTION

Problems to Be Solved by the Invention

The present invention is made in consideration of the aforementioned present situation, and an object thereof is to provide a high-strength hot-dip galvanized steel sheet excellent in impact peeling resistance and worked portion corrosion resistance.

Means for Solving the Problems

The present inventors have conducted intensive studies in order to solve the aforementioned problems. As a result, the present inventors found that plating adhesiveness at an impact time or hard working time remarkably improves by forming an alloy layer in a projecting state in a plating layer of a high-strength hot-dip galvanized steel sheet even when a steel sheet containing a lot of Si and Mn is used as a plating original sheet. At the same time, the present inventors found that it is possible to remarkably suppress occurrence and extension of cracks originated from a base material and penetrating to a plating layer surface layer even under an extremely severe distorted state such as a 180° bending work vertex part by controlling a structure on a steel sheet base material side into a three-layer structure of a miniaturized layer, a decarburized layer, and an inner layer. The present inventors further found that there is an effect of remarkably improving worked portion corrosion resistance while keeping strength as high as 590 MPa by setting the plating layer and the steel sheet base material to have the aforementioned structure, to complete the present invention.

The present invention was made based on such knowledge, and the gist thereof is as follows.

(1)

A high-strength hot-dip galvanized steel sheet excellent in impact resistance and worked portion corrosion resistance, including a hot-dip galvanized plating layer containing Fe: 0.01 to 6.9 mass %, Al: 0.01 to 1.0 mass %, with a balance made up of Zn and inevitable impurities on a steel sheet base material containing, C: 0.05 to 0.4 mass %,
Si: 0.4 to 3.0 mass %,
Mn: 1.0 to 4.0 mass %,
P: 0.0001 to 0.1 mass %,
S: 0.0001 to 0.01 mass %,
Al: 0.005 to 0.1 mass %,
N: 0.0005 to 0.01 mass %, and
O: 0.0001 to 0.01 mass %, with a balance made up of Fe and inevitable impurities, and having a tensile strength of 590 MPa or more, wherein:

the plating layer includes projecting alloy layers which are in contact with the steel sheet base material, a number density of the projecting alloy layers is 4 pieces/mm or more per unit length of an interface between the steel sheet base material and the plating layer when seen from a sectional direction, and a maximum diameter of the projecting alloy layers at the interface is 100 μm or less, wherein the steel sheet base material includes:

a miniaturized layer which is directly in contact with the interface between the steel sheet base material and the plating layer;

a decarburized layer which is in contact with the miniaturized layer and exists on an inward side of the steel sheet base material; and an inner layer other than the miniaturized layer and the decarburized layer, wherein an average thickness of the miniaturized layer is 0.1 to 5 μm, and an average grain diameter of a ferrite phase in the miniaturized layer is 0.1 to 3 μm, an average thickness of the decarburized layer is 10 to 200 μm, an average grain diameter of a ferrite phase in the decarburized layer is 5 to 30 μm, an average volume fraction of the ferrite phase in the decarburized layer is 70% or more, and a remaining structure is made up of austenite, bainite, martensite, or pearlite, a ratio Hv (surf)/Hv (bulk) between an average Vickers hardness of the decarburized layer Hv (surf) and an average Vickers hardness of the inner layer Hv (bulk) is 0.3 to 0.8, and one kind or two kinds or more of oxides of Si and Mn are contained in layers of the miniaturized layer, the decarburized layer, and the projecting alloy layers.

(2)

The high-strength hot-dip galvanized steel sheet excellent in impact resistance and worked portion corrosion resistance according to (1), wherein the oxides contained in the layers of the miniaturized layer, the decarburized layer, and the projecting alloy layers are one kind or two kinds or more from among $SiO_2$, $Mn_2SiO_4$, $MnSiO_3$, $Fe_2SiO_4$, $FeSiO_3$, and MnO.

(3)

The high-strength hot-dip galvanized steel sheet excellent in impact resistance and worked portion corrosion resistance according to (1) or (2), wherein a maximum diameter of the oxides contained in the projecting alloy layers is 0.05 to 0.4 μm, and a number density is 20 to 100 pieces/μm².

(4)

The high-strength hot-dip galvanized steel sheet excellent in impact resistance and worked portion corrosion resistance according to any one of (1) to (3), wherein a maximum diameter of the oxides contained in the miniaturized layer is 0.01 to 0.2 μm, and a number density is 20 to 100 pieces/μm².

(5)

The high-strength hot-dip galvanized steel sheet excellent in impact resistance and worked portion corrosion resistance according to any one of (1) to (4), wherein the projecting alloy layers do not exist at an uppermost surface of the hot-dip galvanized plating layer.

(6)

The high-strength hot-dip galvanized steel sheet excellent in impact resistance and worked portion corrosion resistance according to any one of (1) to (5), wherein the steel sheet base material further contains one kind or two kinds of:

Ti: 0.001 to 0.15 mass %, and
Nb: 0.001 to 0.10 mass %.

(7)

The high-strength hot-dip galvanized steel sheet excellent in impact resistance and worked portion corrosion resistance according to any one of (1) to (6), wherein the steel sheet base material further contains one kind or two kinds or more of:

Mo: 0.01 to 2.0 mass %,
Cr: 0.01 to 2.0 mass %,
Ni: 0.01 to 2.0 mass %,
Cu: 0.01 to 2.0 mass %, and
B: 0.0001 to 0.01 mass %.

Effect of the Invention

A high-strength hot-dip galvanized steel sheet according to the present invention enables to provide a high-strength alloyed hot-dip galvanized steel sheet capable of securing plating adhesiveness at an impact time or hard working time, and excellent in worked portion corrosion resistance even at an extremely severe worked portion such as a 180° bending work vertex part, and it is extremely effective for purposes of inner and outer plates of automobiles and a high-strengthening member, though a high-strength steel sheet containing a lot of Si and Mn is used as an original sheet.

MODE FOR CARRYING OUT THE INVENTION

Figures 1, 2:
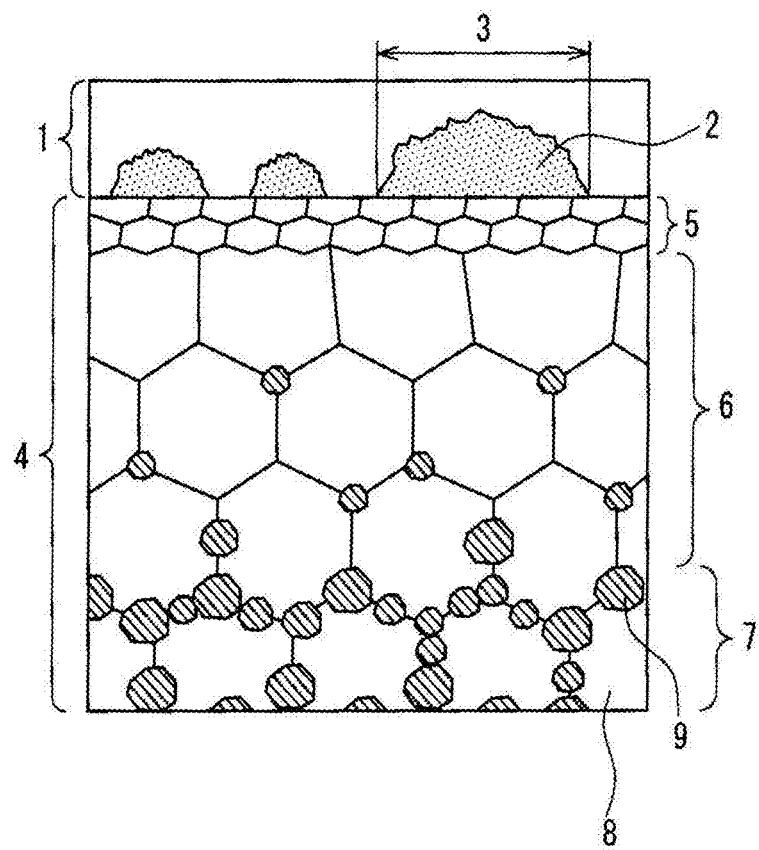
FIG. 1 is a view illustrating an example of a schematic view of a cross-sectional structure of a high-strength hot-dip galvanized steel sheet of the present invention.
FIG. 2 is a cross-sectional photograph of an inner layer of a comparative example and a cross-sectional photograph of an inner layer of an example of the present invention.

The following describes a high-strength hot-dip galvanized steel sheet excellent in impact peeling resistance and worked portion corrosion resistance and a manufacturing method thereof according to an embodiment of the present invention in detail.

A high-strength hot-dip galvanized steel sheet of this invention contains:
C: 0.05 to 0.4 mass %,
Si: 0.4 to 3.0 mass %,
Mn: 1.0 to 4.0 mass %,
P: 0.0001 to 0.1 mass %,
S: 0.0001 to 0.01 mass %,
Al: 0.005 to 0.1 mass %,
N: 0.0005 to 0.01 mass %, and
O: 0.0001 to 0.01 mass %,
with a balance made up of Fe and inevitable impurities,
and includes a hot-dip galvanized plating layer made up of Fe: 0.01 to 6.9 mass %, Al: 0.01 to 1.0 mass %, with a balance made up of Zn and inevitable impurities on a steel sheet base material whose tensile strength is 590 MPa or more, wherein
the plating layer includes projecting alloy layers which are in contact with the steel sheet base material, and a number density of the projecting alloy layers is 4 pieces/mm or more per unit length of an interface between the steel sheet base material and the plating layer when seen from a sectional direction, and a maximum diameter of the projecting alloy layers at the interface is 100 μm or less,
the steel sheet base material includes:
a miniaturized layer which is directly in contact with the interface between the steel sheet base material and the plating layer;
a decarburized layer which is in contact with the miniaturized layer and exists on an inward side of the steel sheet base material; and
an inner layer other than the miniaturized layer and the decarburized layer, wherein
an average thickness of the miniaturized layer is 0.1 to 5 μm, and an average grain size of a ferrite phase in the miniaturized layer is 0.1 to 3 μm,
an average thickness of the decarburized layer is 10 to 200 μm, and an average grain size of a ferrite phase in the decarburized layer is 5 to 30 μm, and an average volume fraction of the ferrite phase in the decarburized layer is 70% or more,
a remaining structure is made up of austenite, bainite, martensite, or pearlite, a ratio Hv (surf)/Hv (bulk) between an average Vickers hardness of the decarburized layer Hv (surf) and an average Vickers hardness of the inner layer Hv (bulk) is 0.3 to 0.8, and
one kind or two kinds or more of oxides of Si and Mn are contained in layers of the miniaturized layer, the decarburized layer, and the projecting alloy layers.

A cross-sectional schematic view of the plating layer, the miniaturized layer, the decarburized layer, and the inner layer in the high-strength hot-dip galvanized steel sheet of this invention is illustrated in FIG. 1.

"Projecting Alloy Layers in Plating Layer"

In a high-strength hot-dip galvanized steel sheet of this invention, plating adhesiveness at an impact time or hard working time can be secured by including projecting alloy layers in a plating layer. Large depressions and projections can be formed at an interface between a steel sheet base material and the plating layer by including projecting alloy layers 2 as illustrated in FIG. 1 in the plating layer, and a remarkable improving effect of the plating adhesiveness can be expected due to an anchoring effect even when a strong shear stress acts in an interface direction between the steel sheet base material and the plating layer by receiving impact and hard working. As a mode of the projecting alloy layers 2, higher anchoring effect can be expected in a mode where small projecting alloy layers are dispersed instead of thinly forming coarse projecting alloy layers. Accordingly, the effective anchoring effect cannot be expected when a maximum diameter of the projecting alloy layers 2 at the interface between a base material 4 and a plating layer 1 which is denoted by 3 in FIG. 1 is over 100 μm because it is too large. An upper limit of a maximum length (the maximum diameter 3) of the projecting alloy layers is therefore set to 100 μm. The upper limit is preferably set to 40 μm. Though a lower limit of the maximum length of the projecting alloy layers 2 is not particularly limited, it is preferably set to 3 μm or more. An effect of improving adhesiveness is exhibited when a number density of the projecting alloy layers is set to 4 pieces or more per an interface length of 1 mm between the steel sheet base material and the plating layer when the interface between the steel sheet base material and the plating layer is seen from a sectional direction. Meanwhile, when the number density of the projecting alloy layers is over 100 pieces/mm, not only the effect is saturated but also chipping resistance may be deteriorated. An upper limit of the number density of the projecting alloy layers is desirably set to 100 pieces/mm. The number density is preferably set in a range of 10 to 60 pieces/mm. As illustrated in FIG. 1, the projecting alloy layers 2 are in contact with the interface between the base material 4 and the plating layer 1, and each have a structure entering from the interface into the plating layer 1 in a projecting state. A shape of each projecting alloy layer 2 is arbitrary as long as the projecting alloy layer 2 is in contact with the interface 3 and enters into the plating layer 1. Since the projecting alloy layers 2 are in contact with the interface with the base material 4 without being intervened by an Fe—Al phase, and protrude into the plating layer 1, the plating adhesiveness is considered to be improved due to the anchoring effect.

The projecting alloy layers in this invention are formed by performing a slight alloying heat treatment after immersing into a plating bath as described later. In the plating bath, micro columnar crystals (hereinafter, it is called a crystallized-in-bath phase) of a microscopic and columnar phase (FeZn$_{13}$) and δ1 phase (FeZn$_7$) which are directly crystallized to be formed at an interface between the steel sheet base material and molten zinc do not negatively affect on the effects of this invention even if it exists together with the projecting alloy layers, but the effect of improving the adhesiveness at the impact time or hard working time cannot be expected. In order to distinguish between the projecting alloy layer and the crystallized-in-bath phase, the projecting alloy layer is defined to be one having a thickness of 2 μm or more, and where the Fe—Al phase is not formed at the interface between the projecting alloy layer and the steel sheet base material. Though an upper limit of the thickness of the projecting alloy layer is not particularly limited, it is preferably set to 90% or less of a total thickness of the plating layer. The projecting alloy layer is directly crystallized to be formed at the interface with the steel sheet base material, and the Fe—Al phase does not exist at the interface. The projecting alloy layer is considered to be effective for adhesiveness improvement because the projecting alloy layer is directly in contact with the base material without being intervened by the Fe—Al phase.

Though kinds of phases forming the projecting alloy layer are not particularly limited, a single-phase structure or a multi-phase structure selected from the ζ phase ($FeZn_{13}$), the δ1 phase ($FeZn_7$), a Γ1 phase ($Fe_5Zn_{21}$), and a Γ phase ($Fe_3Zn_{10}$) being Fe—Zn based intermetallic compound phases is more preferable.

"Measuring Method of Projecting Alloy Layer"

There is a measuring method of the maximum length and the number density of the projecting alloy layers, where 0.5% nital etching is performed after a cross section is embedded and polished, an image is photographed with an optical microscope at a magnification of 200 times to find the number density per unit length. The maximum length of the projecting alloy layers is measured by using the same photograph. The lengths of the projecting alloy layers are measured regarding each of five photographs taken at the magnification of 200 times as for one sample, and a maximum value among them is set to the maximum length of the projecting alloy layers in the sample.

Though the projecting alloy layers are generated from the interface between the plating layer and the steel sheet base material through an alloying reaction, surface luster is lowered and appearance uniformity is lowered when the projecting alloy layers reach an uppermost surface of the plating layer. It is therefore more preferable that the projecting alloy layers do not exist at the uppermost surface of the hot-dip galvanized plating layer in the high-strength hot-dip galvanized steel sheet of this invention.

"Fe Concentration of Plating Layer"

As stated above, a mode control of the projecting alloy layers is important in the high-strength hot-dip galvanized plating layer of this invention. The projecting alloy layers can be included in the plating layer by setting an Fe concentration to 0.01 mass % or more. A partial alloying reaction proceeds to the plating layer surface and the improving effect of the plating adhesiveness becomes small when the Fe concentration is set to over 6.9 mass %. The Fe concentration in the plating layer is therefore limited to a range of 0.01 to 6.9 mass %. The range is preferably 2.0 to 6.9 mass %.

"Al Concentration of Plating Layer"

When an Al concentration in the plating layer is less than 0.01 mass %, an excessive Fe—Zn reaction in the plating bath cannot be controlled and a structure control of the plating layer becomes difficult. When the Al concentration is 1.0 mass %, there is a possibility that spot weldability is obstructed because a dense $Al_2O_3$ film is formed at the plating layer surface. The Al concentration in the plating layer is more preferably set to 0.03 mass % to 0.8 mass % in view of the structure control of the plating layer. The Al concentration is further preferably set in a range of 0.1 mass % to 0.5 mass %.

"Other Inevitable Impurities"

In the embodiment of this invention, one kind or two kinds or more of Pb, Sb, Si, Sn, Mg, Mn, Ni, Cr, Co, Ca, Cu, Li, Ti, Be, Bi, Sr, In, Cs, and REM may be contained or mixed in the hot-dip galvanized plating layer. The effects of the present invention are not impaired even if one kind or two kinds or more of the aforementioned elements are contained or mixed in the hot-dip galvanized plating layer, and there may be a preferable case such that corrosion resistance and workability are improved depending on a content thereof "Measuring Method of Plating Composition"

The plating layer is melted in an inhibitor added 5% HCl aqueous solution, and the molten liquid is ICP analyzed to be quantified in order to measure the Fe concentration and the Al concentration in the plating layer.

"Structure on Steel Sheet Base Material Side"

The following describes a structure on the steel sheet base material side in the high-strength hot-dip galvanized steel sheet of this invention in detail.

"Miniaturized Layer"

As illustrated in FIG. 1, the high-strength hot-dip galvanized steel sheet of this invention includes a miniaturized layer 5 which is directly in contact with the interface between the steel sheet base material and the plating layer on the steel sheet base material side. A layer mainly formed of extremely microscopic grains of a ferrite phase is formed at the miniaturized layer 5, and crack occurrence from an inside of the steel sheet base material and crack extension after that can be suppressed even at a portion under an extremely severe distorted state such as a 180° bending work vertex part.

An effect of suppressing the crack occurrence and extension at the working time is exhibited when an average thickness of the miniaturized layer is set to 0.1 μm or more. When the average thickness of the miniaturized layer is set to over 5 μm, alloying excessively proceeds in the plating bath, and the plating layer structure of this invention cannot be obtained. Accordingly, the average thickness of the miniaturized layer is in limited to a range of 0.1 to 5 μm. The average thickness of the miniaturized layer is preferably set in a range of 0.1 to 3 μm. The effect of suppressing the crack occurrence and extension at the working time is exhibited when an average grain size of the ferrite phase in the miniaturized layer is set to 0.1 μm or more, and the effect becomes limited when the average grain size is set to over 3 μm. Accordingly, the average grain size of the ferrite phase in the miniaturized layer is limited to a range of 0.1 to 3 μm. The average grain size is preferably set in a range of 0.1 to 2 μm.

In this invention, annealing under a condition controlled to be a specific temperature zone and a specific atmosphere is performed in an annealing process in order to generate the miniaturized layer and the decarburized layer as described later. As a result, a decarburization reaction proceeds at a steel sheet base material surface layer in the specific temperature zone. Since the steel sheet base material is decarburized at the miniaturized layer, a constituent phase in the miniaturized layer is substantially a structure whose main body is the ferrite phase except oxide and inclusion particles.

In this invention, the effect obtained by including the miniaturized layer on the steel sheet base material side is to suppress the crack occurrence and extension at the hard working time as described above. At the same time, there is an effect to accelerate an Fe—Zn alloying reaction between the steel sheet base material and the hot-dip galvanized plating layer during a heating and alloying treatment after the hot-dip galvanized plating to form the projecting alloy layers by miniaturizing the ferrite grain size at the steel sheet base material surface layer. It is therefore possible to suppress an input heat amount required for the formation of the projecting alloy layers to be low and to make a heating temperature during the alloying treatment process low under the state where the miniaturized layer is included. An Fe—Zn reaction rate decreases if the heating temperature during the alloying treatment process is lowered, and therefore, it becomes easy to lower the reaction before the projecting alloy layers cover all over the plating layer, and a manufacturable conditional range can be expanded.

"Measuring Method of Miniaturized Layer"

In order to measure the miniaturized layer, a cross-section is processed by using a CP (cross section polisher) device, a reflected electron image taken by an FE-SEM (field emission scanning electron microscopy) is observed at a magnification of 5000 times, to measure the average thickness of the miniaturized layer and the average grain size of the ferrite phase in the miniaturized layer. The miniaturized layer is defined to exist when an average grain size of the ferrite phase at the steel sheet base material uppermost surface layer is ½ or less of an average grain size of a ferrite phase at the decarburized layer. An interface where the average grain size of the ferrite phase at the miniaturized layer becomes over ½ of the average grain size of the ferrite phase at the decarburized layer is defined as a layer interface between the miniaturized layer and the decarburized layer.

"Decarburized Layer"

In the high-strength hot-dip galvanized steel sheet of this invention, there is a decarburized layer 6 as illustrated in FIG. 1. At the decarburized layer 6, since a volume fraction of hard phases (remaining structures 9) is lower and strength is also lower compared to an inner layer 7, the decarburized layer 6 is unlikely to be an origin of cracks even under the severe distorted state at the 180° bending work vertex part, the crack occurrence at the 180° bending work vertex part can be suppressed. The effect of suppressing the crack occurrence even at the 180° bending work vertex part is exerted by setting an average thickness of the decarburized layer to 10 μm or more, but tensile strength of the entire steel sheet base material is lowered due to properties of the decarburized layer when the average thickness is set to over 200 μm. Accordingly, the average thickness is limited to a range of 10 to 200 μm. The range is preferably 30 to 150 μm.

"Steel Sheet Structure at Decarburized Layer"

The decarburized layer 6 has a mixed structure where a ferrite phase 8 is a main body, and the remaining structures 9 are occupied by one kind or two kinds or more from among the austenite phase, the bainite phase, the martensite phase, and the pearlite phase as illustrated in FIG. 1. Average hardness of the decarburized layer 6 with respect to the inner layer 7 is sufficiently lowered by setting the volume fraction of the ferrite phase at the decarburized layer 6 to 70% or more, and thereby, the effect of suppressing the crack occurrence at the 18° bending work vertex part is exhibited. When the average grain size of the ferrite phase at the decarburized layer is less than 5 μm, an effect of softening the decarburized layer is insufficient. When the average grain size of the ferrite phase at the decarburized layer is over 30 μm, there is a possibility that low-temperature toughness is deteriorated. The average grain size of the ferrite phase at the decarburized layer is therefore limited to a range of 5 to 30 μm. A ratio Hv (surf)/Hv (bulk) between an average Vickers hardness of the decarburized layer Hv (surf) and an average Vickers hardness of the inner layer Hv (bulk) can be set in a range of 0.3 to 0.8 by the decarburized layer having the structure of this invention. The hardness of the decarburized layer is necessary to be lowered with respect to bulk hardness in order to suppress the occurrence of cracks in a vicinity of the interface between the steel sheet base material and the plating layer surface layer at the 180° bending work vertex part. When the Hv (surf)/Hv (bulk) is less than 0.3, there is a possibility that a negative effect is exhibited on the strength of the entire steel sheet base material because the hardness of the decarburized layer is too low. When the Hv (surf)/Hv (bulk) is over 0.8, the cracks may occur at the 180° bending work vertex part because the decarburized layer is not sufficiently softened with respect to the inner layer. Accordingly, the Hv (surf)/Hv (bulk) is limited to the range of 0.3 to 0.8 in this invention. The Hv (surf)/Hv (bulk) is preferably set in a range of 0.3 to 0.6.

"Measuring Method of Decarburized Layer"

In order to measure the thickness of the decarburized layer, first, the cross-section of the steel sheet is embedded and polished, a hardness curve is measured by using micro Vickers from the interface between the steel sheet base material and the plating layer toward the steel sheet base material side, to find a thickness of a layer whose hardness is lowered with respect to the hardness of the inner layer. The found thickness of the layer includes both of the decarburized layer thickness and the miniaturized layer thickness, and a value where the miniaturized layer thickness which is found through the aforementioned method is subtracted from the thickness of the layer found by using the micro Vickers is the decarburized layer thickness. An average value of the measured hardnesses at the decarburized layer is set as the Hv (surf), and an average value of the measured hardnesses at the inner layer is set as the Hv (bulk).

In order to find the volume fraction of the ferrite phase at the decarburized layer, a sample is obtained while setting a thicknesswise cross-section which is in parallel to a rolling direction of the steel sheet base material as an observation surface, the observation surface is polished and nital-etched, then observed by the FE-SEM at the decarburized layer to measure an area fraction of the ferrite phase, and the result can be regarded as the volume fraction. The grain size of the ferrite phase can be simultaneously measured.

"Structure of Inner Layer"

A structure mode of the inner layer in this invention is not particularly limited as long as the tensile strength of the steel sheet is 590 MPa or more, and the Hv (surf)/Hv (bulk) within the range of 0.3 to 0.8 can be secured. However, the structure is preferably formed of 50% or more of the ferrite phase and the remaining structures 9 made up of martensite, austenite, bainite, and pearlite in view of securing a balance between strength and ductility.

"Improvement Effect of Worked Portion Corrosion Resistance"

The high-strength hot-dip galvanized steel sheet of this invention includes the projecting alloy layers in the plating layer, and the miniaturized layer and the decarburized layer on the steel sheet base material side. The effect as a simple substance of each is as described above, but remarkable improvement effect of the corrosion resistance which cannot be expected in the past can be obtained at a worked portion under the extremely severe distorted state such as the 180° bending work vertex part when all of the layers are provided as defined in this invention. When only the projecting alloy layers exist but the miniaturized layer and the decarburized layer do not exist at the steel sheet base material surface layer, cracks may occur because the distortion is large at the steel sheet base material surface layer of the 180° bending work vertex part, resulting in that the cracks penetrate to the plating layer surface, and the worked portion corrosion resistance decreases. When the miniaturized layer and the decarburized layer exist on the steel sheet base material side but the projecting alloy layers do not exist, the plating layer deforms following large distortion of the base material, the adhesiveness remarkably decreases in the vicinity of the interface between the steel sheet base material and the plating layer, resulting in that the plating layer is peeled off to lower the worked portion corrosion resistance, though the cracks at the steel sheet base material surface layer can be suppressed at the 180° bending work vertex part.

In this invention, the cracks do not occur from the steel sheet base material surface layer part at the 180° bending work vertex part only under the state where all of the projecting alloy layers, the miniaturized layer, and the decarburized layer exist, and the adhesiveness does not decrease in the vicinity of the interface between the steel sheet base material and the plating layer and the plating is not peeled off even at a region where the plating layer deforms following the deformation of the steel sheet base material owing to the anchoring effect due to existence of the projecting alloy layers. Accordingly, the worked portion corrosion resistance can be remarkably improved.

"Oxide"

In the high-strength hot-dip galvanized steel sheet of this invention, oxides containing one kind or two kinds or more of Si and Mn are contained in the layers of the miniaturized layer, the decarburized layer, and the projecting alloy layers. Kinds of the oxides contained in the miniaturized layer, the decarburized layer, and the projecting alloy layers are more preferably one kind or two kinds or more selected from $SiO_2$, $Mn_2SiO_4$, $MnSiO_3$, $Fe_2SiO_4$, $FeSiO_3$, and MnO.

"Oxide in Projecting Alloy Layers"

The effect obtained by forming the projecting alloy layers 2 in the plating layer 1 is improvement in the plating adhesiveness at the impact time or hard working time as described above. The projecting alloy layers are formed by forming internal oxides on the steel sheet base material surface at a specific temperature zone during the annealing of the steel sheet base material, and slight alloying heat treatment is performed after the hot-dip galvanized plating as described later. Since the projecting alloy layers 2 as illustrated in FIG. 1 can be formed by the aforementioned reaction, the projecting alloy layers inevitably contain oxides. The oxides contained in the projecting alloy layers more preferably have a maximum diameter of 0.05 to 0.4 μm, and a number density of 20 to 100 pieces/μm².

"Oxide in Miniaturized Layer"

In this invention, the miniaturized layer 5 having the structure as illustrated in FIG. 1 can be formed by forming the internal oxides in the steel sheet base material inside at the specific temperature zone at the annealing time, and suppressing growth of ferrite phase crystals on the steel sheet base material surface layer due to internal oxide particles as described later. The decarburized layer inevitably contains oxides. The oxides contained in the decarburized layer more preferably have a maximum diameter of 0.01 μm to 0.2 μm, and a number density of 20 to 100 pieces/μm².

"Measurement of Oxide"

In order to measure presence/absence, identification of a kind, a maximum diameter, and a number density of an oxide layer, a cross-section of a plated steel sheet is FIB (focused ion beam) processed to fabricate a thin film sample, then the sample is observed by the FE-TEM (field emission transmission electron microscopy) at a magnification of 3000 times. Five visual fields are photographed regarding one sample, and an average value of the number densities of the oxides through all visual fields is set as the number density of the sample. A maximum value of diameters of the oxides measured in all of the visual fields is set as the maximum diameter of the oxide of the sample.

"Chemical Composition of Steel Sheet Base Material"

The following describes a chemical composition of the base steel sheet forming the high-strength hot-dip galvanized steel sheet according to the embodiment of the present invention.

C: C is an element increasing strength of steel, and it is effective to contain 0.05 mass % or more. However, since the strength increases too much to lower workability when it is excessively contained, an upper limit is set to 0.4 mass %. A content is preferably set in a range of 0.07 to 0.3 mass % in view of workability and weldability.

Si: Si is an effective element capable of improving the strength without lowering ductility, and it is effective to contain 0.4 mass % or more. On the other hand, when C is added over 3.0 mass %, the effect of increasing the strength saturates and the ductility is lowered. In addition, deterioration of plating wettability is remarkable, to largely impair an appearance. An upper limit is therefore set to 3.0 mass %. A content is preferably set in a range of 0.5 to 2.5 mass %.

Mn: Mn is an important element to enable high strength, and it is added 1.0 mass % or more. However, since cracks are likely to occur at a slab, and spot weldability is also deteriorated when Mn is contained over 4.0 mass %, an upper limit is set to 4.0 mass %. A content is preferably set in a range of 1.5 to 3.5 mass % in view of the strength and the workability.

P: Since P is also an element increasing the strength of steel, but lowering the workability, an upper limit is set to 0.1 mass %. A lower limit is set to 0.0001 mass % because large refining cost is required to reduce a P content to less than 0.0001 mass %. The content is preferably set to 0.005 to 0.02 mass % from a balance among the strength, the workability, and the cost.

S: S is an element lowering hot-workability and corrosion resistance of steel. An upper limit of a content is set to 0.01 mass % because the hot-workability and the corrosion resistance are deteriorated when the content exceeds 0.01 mass %. A lower limit is set to 0.0001 mass % because it is financially disadvantageous to reduce the content to less than 0.0001 mass %. However, the content is preferably 0.001 mass % or more because a surface defect is likely to occur when the content of S is reduced too much.

Al: Al is necessary to be added 0.005 mass % or more as a deoxidizing element of steel, and in order to suppress grain refining of hot-rolling material by AN and coarsening of crystal grains in a series of heat treatment process to improve a material. Since there is a possibility that weldability is deteriorated when a content is over 0.1 mass %, the content is set to 0.1 mass % or less. The content is preferably 0.08 mass % or less in view of reducing a surface defect due to alumina cluster.

N: Since N increases the strength of steel but lowers workability, an upper limit is set to 0.01 mass %. The upper limit is more preferably set to 0.005 mass % or less when extremely high workability is required. The fewer a content of N is, the more it is preferable, but a lower limit is set to 0.0005 mass % because excessive cost is required to reduce the content to less than 0.0005 mass %.

O: Since O forms oxide, and deteriorates ductility and stretch frangibility, a content is necessary to be suppressed. An upper limit of the O content is set to 0.010% because deterioration of the stretch frangibility becomes remarkable when the content of O exceeds 0.010%. The O content is preferably 0.007% or less, and more preferably 0.005% or less. Although effects of the present invention are exhibited without particularly setting a lower limit of the O content, the lower limit is set to 0.0001% because large increase in manufacturing cost is accompanied by setting the O content to less than 0.0001%. The O content is preferably 0.0003% or more, and more preferably 0.0005% or more.

In addition, the following elements may be added to the steel sheet base material of the hot-dip galvanized steel sheet according to the embodiment of this invention, as necessary.

Ti: Ti is an element which contributes to strength increase of the steel sheet by precipitation strengthening, fine grain strengthening by growth suppression of ferrite crystal grains, and dislocation strengthening through suppression of recrystallization. However, when a content of Ti exceeds 0.150%, precipitation of carbonitride increases and formability deteriorates, and thus the content of Ti is preferably 0.150% or less. In view of formability, the content of Ti is more preferably 0.080% or less. Although effects of the present invention are exhibited without particularly setting a lower limit of the content of Ti, the content of Ti is preferably 0.001% or more so as to sufficiently obtain the strength increasing effect by adding Ti. To further increase the strength of the steel sheet, the content of Ti is more preferably 0.010% or more.

Nb: Nb is an element which contributes to strength increase of the steel sheet by precipitation strengthening, fine grain strengthening by growth suppression of ferrite crystal grains, and dislocation strengthening through suppression of recrystallization. However, when a content of Nb exceeds 0.100%, precipitation of the carbonitride increases and formability deteriorates, and thus the content of Nb is preferably 0.100% or less. In view of formability, the content of Nb is more preferably 0.050% or less. Although effects of the present invention are exhibited without particularly setting a lower limit of the content of Nb, the content of Nb is preferably 0.001% or more so as to sufficiently obtain the strength increasing effect by adding Nb. To further increase the strength of the steel sheet, the content of Nb is more preferably 0.010% or more.

Mo: Mo suppresses phase transformation at high temperature and is an element effective for increasing strength, and may be added in place of part of C and/or Mn. When a content of Mo exceeds 2.00%, workability during hot working is impaired and productivity decreases. Thus, the content of Mo is preferably 2.00% or less, and more preferably 1.40% or less. Although effects of the present invention are exhibited without particularly setting a lower limit of the content of Mo, the content of Mo is preferably 0.01% or more, and more preferably 0.10% or more so as to sufficiently obtain the effect of strength increase by adding Mo.

Cr: Cr suppresses phase transformation at high temperature and is an element effective for increasing strength, and may be added in place of part of C and/or Mn. When a content of Cr exceeds 2.00%, workability during hot working is impaired and productivity decreases, and thus the content of Cr is preferably 2.00% or less, and more preferably 1.40% or less. Although effects of the present invention are exhibited without particularly setting a lower limit of the content of Cr, the content of Cr is preferably 0.01% or more, and more preferably 0.10% or more so as to sufficiently obtain the effect of strength increase by adding Cr.

Ni: Ni suppresses phase transformation at high temperature and is an element effective for increasing strength, and may be added in place of part of C and/or Mn. When a content of Ni exceeds 2.00%, weldability is impaired, and thus the content of Ni is preferably 2.00% or less, and more preferably 1.40% or less. Although effects of the present invention are exhibited without particularly setting a lower limit of the content of Ni, the content of Ni is preferably 0.01% or more, and more preferably 0.10% or more so as to sufficiently obtain the effect of strength increase by adding Ni.

Cu: Cu is an element which increases strength by existing as fine particles in steel, and can be added in place of part of C and/or Mn. When a content of Cu exceeds 2.00%, weldability is impaired, and thus the content of Cu is preferably 2.00% or less, and more preferably 1.40% or less. Although effects of the present invention are exhibited without particularly setting a lower limit of the content of Cu, the content of Cu is preferably 0.01% or more, and more preferably 0.10% or more so as to sufficiently obtain the effect of strength increase by adding Cu.

B: B suppresses phase transformation at high temperature and is an element effective for increasing strength, and may be added in place of part of C and/or Mn. When a content of B exceeds 0.010%, workability during hot working is impaired and productivity decreases. Thus, the content of B is preferably 0.010% or less. In view of productivity, the content of B is more preferably 0.006% or less.

Although effects of the present invention are exhibited without particularly setting a lower limit of the content of B, the content of B is preferably 0.0001% or more so as to sufficiently obtain the effect of strength increase by adding B. To further increase strength, the content of B is more preferably 0.0005% or more.

"Manufacturing Method"

Next, the following describes a method of manufacturing the high-strength hot-dip galvanized steel sheet of this invention. In the manufacturing method of the high-strength hot-dip galvanized steel sheet of this invention, a slab having the aforementioned chemical composition is used as an original plate, and hot-rolling, cooling, coiling, pickling, and cold-rolling are performed. Subsequently, after heating and annealing by CGL is performed, the resultant is immersed in a hot-dip galvanized plating bath to make the high-strength hot-dip galvanized steel sheet.

The slab to be subjected to the hot-rolling is not particularly limited, and a continuously cast slab or a slab produced by a thin slab caster or the like can be used. The manufacturing method is compatible with a process like continuous casting-direct rolling (CC-DR) in which hot-rolling is performed immediately after casting.

A finishing temperature of the hot-rolling is not particularly limited, but it is more preferably 850 to 970° C. in view of securing press formability of the steel sheet. Although cooling conditions and a coiling temperature after the hot-rolling are not particularly limited, the coiling temperature is preferably set to 750° C. or less to avoid that material variation at coil both end parts becomes large and deterioration of picklability due to increase in a scale thickness. Further, the coiling temperature is preferably set to 550° C. or more because edge cracking is likely to occur at the cold-rolling time, and sheet fracture may occur in the extreme case if the coiling temperature is too low. After normal pickling is performed to remove a black scale, a reduction ratio at the cold-rolling time may be a normal condition, and the reduction ratio is more preferably set to 50% or more in order to obtain a maximum improvement effect of workability. Meanwhile, since a lot of cold-rolling loads are necessary to perform the cold-rolling at the reduction ratio over 85%, the reduction ratio is more preferably set to 85% or less.

The hot-dip galvanized plating is performed after the cold-rolling is performed as described above. As an example of a preferable manufacturing method of the high-strength hot-dip galvanized steel sheet of this invention, an atmosphere when the steel sheet having the aforementioned chemical composition is subjected to the hot-dip galvanized plating is set to an atmosphere containing $H_2$ for 0.1 to 20 volume %, with the balance made up of $N_2$, $H_2O$, $O_2$ and inevitable impurities, and an atmosphere between 650° C. to a maximum heating temperature is set to an atmosphere satisfying $-1.7 \leq \log(P_{H2O}/P_{H2}) \leq -0.6$, and temperature rise heating is performed at an average temperature rise rate of 0.5 to 5° C./s, after that, annealing is continuously performed, then cooling is performed to 650° C. at an average cooling rate of 0.1 to 200° C./s, cooling is performed from 650° C. to 500° C. at an average cooling rate of 3 to 200° C./s, the steel sheet is immersed into a galvanized plating bath under conditions of a galvanized plating bath temperature: 450 to 470° C., a steel sheet temperature at a plating bath entering time: 430 to 500° C., then heated and alloyed at 400 to 440° C. for 1 to 50 s, and thereafter, the steel sheet is cooled to the room temperature.

The hot-dip galvanized plating is preferably performed at all reducing furnaces of a continuous hot-dip galvanizing facility. An atmosphere at the annealing time is set to an atmosphere containing $H_2$ for 0.1 to 20 volume %, with the balance made up of $N_2$, $H_2O$, $O_2$ and inevitable impurities. When hydrogen is less than 0.1 volume %, an oxide film existing at the steel sheet surface layer cannot be sufficiently reduced, and the plating wettability cannot be secured. A hydrogen amount in a reduction annealing atmosphere is therefore set to 0.1 volume % or more. When hydrogen in the reduction annealing atmosphere exceeds 20 volume %, a dew point (corresponding to a water vapor partial pressure $P_{H2O}$) excessively increases, and a facility to prevent dew condensation is necessary to be installed. Since installation of a new facility results in increase in a production cost, the hydrogen amount in the reduction annealing atmosphere is set to 20 volume % or less. The hydrogen amount is more preferably 0.5 volume % or more and 15 volume % or less.

The atmosphere from the temperature of 650° C. to the maximum heating temperature is set to the atmosphere satisfying $-1.7 \leq \log(P_{H2O}/P_{H2}) \leq 0.6$, and the temperature rise heating is performed at the average temperature rise rate of 0.5 to 5° C./s, and thereby, the miniaturized layer 5 and the decarburized layer 6 of this invention as illustrated in FIG. 1 are formed. Recrystallization of a steel sheet structure is seldom started at a temperature zone of less than 650° C. The recrystallization starts, and nucleated recrystallized grains gradually grow at a temperature zone of 650° C. or more. By increasing the $\log(P_{H2O}/P_{H2})$ of the atmosphere during annealing to make the atmosphere on the easy oxidation side at the temperature zone, Si and Mn in the steel sheet base material are internally oxidized at the surface layer of the steel sheet base material, and the internal oxide particles suppress the grain growth of the recrystallized grains of the steel sheet base material to form the fine recrystallized grains at the steel sheet base material surface layer, and the miniaturized layer 5 can be formed. A decarburization reaction proceeds at the steel sheet base material surface layer simultaneously with the internal oxidation to increase the volume fraction of the ferrite phase at the steel sheet base material surface layer, and the decarburized layer 6 can be formed. When the $\log(P_{H2O}/P_{H2})$ of the atmosphere between the temperature of 650° C. and the maximum heating temperature is less than $-1.7$, the miniaturized layer and the decarburized layer cannot be formed because Si and Mn are seldom internally oxidized and the decarburization reaction does not also proceed at the steel sheet surface layer. When the $\log(P_{H2O}/P_{H2})$ is over $-0.6$, the thickness of the decarburized layer becomes too large to exert negative effect on the strength of the entire steel sheet base material. Accordingly, the $\log(P_{H2O}/P_{H2})$ is preferably set in a range of $-1.7 \leq \log(P_{H2O}/P_{H2}) \leq -0.6$. The $\log(P_{H2O}/P_{H2})$ is more preferably $-1.3 \leq \log(P_{H2O}/P_{H2}) \leq -0.7$. When the average temperature rise rate at this temperature zone is over 5° C./s, the miniaturized layer cannot be obtained because recrystallization at the steel sheet base material surface layer proceeds before the internal oxide particles are formed. Further, the decarburized layer cannot be obtained because time necessary for proceeding of the decarburization reaction cannot be sufficiently secured. Meanwhile, when the average temperature rise rate at this temperature zone is less than 0.5° C./s, the decarburization reaction excessively proceeds, and there is a possibility that the strength of the entire steel sheet base material decreases. The average temperature rise rate between 650° C. and the maximum heating temperature is therefore preferably set in the range of 0.5 to 5° C./s. The average temperature rise rate is more preferably set in a range of 0.5 to 3° C./s.

The maximum heating temperature is not particularly limited, but it is preferably set in a range of 800 to 900° C. because there is a possibility that a sheet shape at a high-temperature sheet passing time becomes very bad when the maximum heating temperature is over 900° C.

In this invention, the annealing is continuously performed after the temperature rise heating. An annealing time is not particularly limited, and conditions may be set as necessary, but the annealing time is preferably set in a range of 1 s to 300 s in view of economic efficiency and a surface property of the sheet. The annealing time is more preferably set in a range of 30 s to 150 s.

After the annealing is finished, the steel sheet is cooled to a plating bath immersion temperature. The average cooling rate from the maximum heating temperature to 650° C. is desirably set to 0.1 to 200° C./s. The cooling rate of less than 0.1° C./s is not desirable because productivity is largely impaired. An upper limit is preferably set to 200° C./s because excessive increase in the cooling rate results in manufacturing cost increase. The cooling rate from 650 to 500° C. is preferably set to 3 to 200° C./s. When the cooling rate is too small, austenite transforms into pearlite structure during the cooling process, and it becomes difficult to secure the austenite volume ratio of 3% or more. A lower limit is preferably set to 3° C./s. Meanwhile, there is no problem in view of the material if the cooling rate is made large, but excessive increase in the cooling rate results in the manufacturing cost increase. An upper limit is preferably set to 200° C./s. A cooling method may be any method from among roll cooling, air cooling, water cooling, and a method combining these methods.

A plating bath temperature in the hot-dip galvanized plating process is preferably set to 450 to 470° C. When the plating bath temperature is less than 450° C., a bath temperature control becomes unstable and there is a possibility that the bath is partly solidified. When the bath temperature exceeds 470° C., operating life of facilities such as a sink roll and a zinc pot becomes short. Accordingly, the bath temperature of the galvanized plating bath is preferably set to 450 to 470° C.

An entering sheet temperature of the steel sheet into the plating bath is preferably set to 430 to 500° C. When the entering sheet temperature is less than 430° C., the plating bath temperature considerably decreases, and it becomes necessary to give a large heat quantity to the plating bath in order to stabilize the bath temperature. Accordingly, a lower limit is preferably set to 430° C. When the entering sheet temperature exceeds 500° C., an alloying reaction of Fe and Zn in the bath cannot be controlled, and an adhesion amount is difficult to be controlled. Accordingly, an upper limit is preferably set to 500° C.

Though an Al concentration in the plating bath is not particularly limited, an effective Al concentration (a total Al concentration in the bath—a total Fe concentration in the bath) is preferably set in a range of 0.03 to 0.8 mass % in order to form the projecting alloy layers in the plating layer.

After the immersion into the plating bath, the steel sheet is preferably subjected to the heating and alloying treatment at 400 to 440° C. for 1 s to 50 s, and then cooling to the room temperature. In the heating and alloying treatment process, the low-temperature alloying enables to proceed a local alloying reaction, and thereby, the projecting alloy layers in the high-strength hot-dip galvanized steel sheet of this invention can be formed. Since the projecting alloy layers are not formed because the local alloying reaction seldom occurs when the alloying temperature is less than 400° C., a lower limit is preferably set to 400° C. Since it is difficult to obtain the mode of the projecting alloy layers because the alloying reaction expands not locally but totally when the alloying temperature exceeds 440° C., an upper limit is preferably set to 440° C. The heating time is preferably set in the range of 1 s to 50 s because the projecting alloy layers are not formed when the heating time is less than 1 s, and a line length of an alloying furnace becomes too long when the heating time exceeds 50 s.

In this invention, the heating and alloying treatment is preferably stopped before the projecting alloy layers generated from the interface between the plating layer and the steel sheet base material reach the surface of the plating layer. A heating time which is required until the alloying reaction completely proceeds to the surface in the temperature range of 400 to 440° C. is desirably found in advance by passing the steel sheet having the same component as the steel sheet to be manufactured. By retaining the steel sheet while heating for 10 to 80% of the heating time necessary for the complete alloying (alloying completion time) found in advance, it becomes possible to accurately fabricate the projecting alloy layers without reaching the plating layer surface.

Example 1

The following describes examples of the present invention. Conditions of the examples are conditional examples which are employed to verify feasibility and effects of the present invention, and the present invention is not limited to these conditional examples. The present invention is able to employ various conditions as long as an object of the present invention is attained without departing from the scope of the present invention.

Slabs having the compositions listed in Table 1 were heated to 1150 to 1250° C., subjected to the hot-rolling such that the finishing temperature became 850 to 970° C. to have hot-rolled steel strips each with a thickness of 2.4 mm. After the pickling, the resultants were subjected to the cold-rolling to have cold-rolled steel strips each with a thickness of 1.0 mm, then passed through the hot-dip galvanized line under conditions listed in Table 2 to manufacture hot-dip galvanized steel sheets of Examples 1 to 34.

TABLE 1

| STEEL TYPE NUMBER | C | Si | Mn | P | S | Al | N | O | Ti | Nb | Mo | Cr | Ni | Cu | B | REMARKS |
|---|---|---|---|---|---|---|---|---|---|---|---|---|---|---|---|---|
| 1 | 0.198 | 1.61 | 2.55 | 0.011 | 0.0015 | 0.024 | 0.0042 | 0.0027 | 0.031 | | | | | | 0.0019 | PRESENT INVENTION COMPONENT |
| 2 | 0.203 | 1.77 | 2.61 | 0.010 | 0.0019 | 0.020 | 0.0020 | 0.0019 | | | | | | | | PRESENT INVENTION COMPONENT |
| 3 | 0.225 | 1.54 | 1.69 | 0.006 | 0.0010 | 0.028 | 0.0046 | 0.0021 | 0.018 | | 0.251 | | | | 0.0018 | PRESENT INVENTION COMPONENT |
| 4 | 0.081 | 0.53 | 2.21 | 0.019 | 0.0012 | 0.013 | 0.0021 | 0.0007 | 0.022 | 0.029 | 0.015 | | | | 0.0024 | PRESENT INVENTION COMPONENT |
| 5 | 0.079 | 0.48 | 1.97 | 0.015 | 0.0013 | 0.015 | 0.0037 | 0.0017 | | | | | | | | PRESENT INVENTION COMPONENT |
| 6 | 0.195 | 1.28 | 2.32 | 0.014 | 0.0029 | 0.026 | 0.0023 | 0.0018 | 0.048 | | | | | | | PRESENT INVENTION COMPONENT |
| 7 | 0.154 | 1.81 | 2.96 | 0.007 | 0.0022 | 0.045 | 0.0018 | 0.0023 | | | | | 1.109 | 0.481 | | PRESENT INVENTION COMPONENT |
| 8 | 0.246 | 1.96 | 3.34 | 0.019 | 0.0021 | 0.035 | 0.0029 | 0.0022 | 0.052 | | 0.103 | 0.504 | | | 0.0015 | PRESENT INVENTION COMPONENT |
| 9 | 0.052 | 0.41 | 1.03 | 0.0005 | 0.0003 | 0.005 | 0.0008 | 0.0005 | | | | | | | | PRESENT INVENTION COMPONENT |
| 10 | 0.071 | 0.50 | 1.50 | 0.005 | 0.0010 | 0.005 | 0.0005 | 0.0005 | | | | | | | | PRESENT INVENTION COMPONENT |

TABLE 1-continued

| STEEL TYPE NUMBER | C | Si | Mn | P | S | Al | N | O | Ti | Nb | Mo | Cr | Ni | Cu | B | REMARKS |
|---|---|---|---|---|---|---|---|---|---|---|---|---|---|---|---|---|
| 11 | 0.394 | 2.96 | 3.98 | 0.097 | 0.0095 | 0.098 | 0.0093 | 0.0092 | | | | | | | | PRESENT INVENTION COMPONENT |
| 12 | 0.299 | 2.48 | 3.47 | 0.020 | 0.0094 | 0.078 | 0.0050 | 0.0048 | | | | | | | | PRESENT INVENTION COMPONENT |
| 13 | 0.139 | 3.52 | 2.64 | 0.017 | 0.0023 | 0.034 | 0.0032 | 0.0019 | | | | | | | | COMPARATIVE COMPONENT |

TABLE 2

| EXPERIMENTAL RUN NUMBER | STEEL TYPE NUMBER | ANNEALING CONDITION TEMPERATURE 650° C. to MAXIMUM HEATING TEMPERATURE | | | | HOT-DIP GALVANIZED PLATING CONDITION | | | ALLOYING CONDITION | | RATIO WITH RESPECT TO ALLOYING COMPLETION TIME (%) | REMARKS |
|---|---|---|---|---|---|---|---|---|---|---|---|---|
| | | Log (PH2O/PH2) | TEMPERATURE RISE RATE (° C./s) | MAXIMUM HEATING TEMPERATURE (° C) | ANNEALING TIME(s) | PLATING BATH TEMPERATURE (° C) | ENTERING TIME SHEET TEMPERATURE (° C) | PLATING BATH EFFECTIVE Al CONCENTRATION (MASS %) | ALLOYING TEMPERATURE (° C) | ALLOYING TIME(s) | | |
| 1 | 1 | −1.4 | 4 | 870 | 180 | 455 | 445 | 0.13 | 430 | 39 | 12 | EXAMPLE OF PRESENT INVENTION |
| 2 | 1 | −1.4 | 4.5 | 840 | 60 | 460 | 470 | 0.08 | 430 | 39 | 55 | EXAMPLE OF PRESENT INVENTION |
| 3 | 1 | −1.1 | 2.3 | 830 | 50 | 465 | 470 | 0.15 | 400 | 14 | 78 | EXAMPLE OF PRESENT INVENTION |
| 4 | 1 | −1.3 | 1.1 | 910 | 250 | 455 | 460 | 0.13 | 410 | 42 | 94 | COMPARATIVE EXAMPLE |
| 5 | 2 | −1.7 | 4 | 860 | 180 | 460 | 455 | 0.15 | 410 | 38 | 15 | EXAMPLE OF PRESENT INVENTION |
| 6 | 2 | −1.5 | 4.5 | 820 | 130 | 465 | 465 | 0.1 | 420 | 10 | 66 | EXAMPLE OF PRESENT INVENTION |
| 7 | 2 | −0.8 | 2.6 | 810 | 70 | 450 | 465 | 0.15 | 430 | 23 | 25 | EXAMPLE OF PRESENT INVENTION |
| 8 | 2 | −3 | 10 | 820 | 120 | 455 | 465 | 0.3 | 400 | 34 | 75 | COMPARATIVE EXAMPLE |
| 9 | 3 | −1.5 | 4.5 | 880 | 200 | 455 | 450 | 0.14 | 440 | 18 | 11 | EXAMPLE OF PRESENT INVENTION |
| 10 | 3 | −1.7 | 4.5 | 810 | 150 | 450 | 445 | 0.08 | 420 | 19 | 51 | EXAMPLE OF PRESENT INVENTION |
| 11 | 3 | −1.3 | 0.5 | 850 | 150 | 450 | 445 | 0.09 | 410 | 37 | 55 | EXAMPLE OF PRESENT INVENTION |
| 12 | 4 | −1.5 | 4 | 800 | 240 | 460 | 450 | 0.1 | 400 | 26 | 13 | EXAMPLE OF PRESENT INVENTION |

TABLE 2-continued

| EXPERIMENTAL RUN NUMBER | STEEL TYPE NUMBER | ANNEALING CONDITION TEMPERATURE 650° C. to MAXIMUM HEATING TEMPERATURE | | | | HOT-DIP GALVANIZED PLATING CONDITION | | | ALLOYING CONDITION | | RATIO WITH RESPECT TO ALLOYING COMPLETION TIME (%) | REMARKS |
|---|---|---|---|---|---|---|---|---|---|---|---|---|
| | | Log (PH2O/PH2) | TEMPERATURE RISE RATE (° C./s) | MAXIMUM HEATING TEMPERATURE (° C) | ANNEALING TIME(s) | PLATING BATH TEMPERATURE (° C) | ENTERING TIME SHEET TEMPERATURE (° C) | PLATING BATH EFFECTIVE Al CONCENTRATION (MASS %) | ALLOYING TEMPERATURE (° C) | ALLOYING TIME(s) | | |
| 13 | 4 | −1.7 | 4.5 | 850 | 60 | 465 | 465 | 0.2 | 440 | 16 | 74 | EXAMPLE OF PRESENT INVENTION |
| 14 | 4 | −1.2 | 2 | 820 | 50 | 470 | 430 | 0.25 | 420 | 10 | 15 | EXAMPLE OF PRESENT INVENTION |
| 15 | 4 | −1.2 | 2 | 820 | 50 | 470 | 430 | 0.25 | 420 | 30 | 44 | EXAMPLE OF PRESENT INVENTION |
| 16 | 4 | −1.2 | 2 | 820 | 50 | 470 | 430 | 0.25 | 420 | 68 | 100 | COMPARATIVE EXAMPLE |
| 17 | 5 | −1.6 | 4.5 | 890 | 300 | 450 | 445 | 0.12 | 420 | 44 | 18 | EXAMPLE OF PRESENT INVENTION |
| 18 | 5 | −1.6 | 4 | 820 | 30 | 450 | 465 | 0.2 | 420 | 14 | 29 | EXAMPLE OF PRESENT INVENTION |
| 19 | 5 | −1 | 2.9 | 810 | 80 | 465 | 470 | 0.13 | 420 | 42 | 33 | EXAMPLE OF PRESENT INVENTION |
| 20 | 5 | −0.8 | 2 | 800 | 120 | 465 | 470 | 0.11 | <u>520</u> | 44 | 100 | COMPARATIVE EXAMPLE |
| 21 | 6 | −1.5 | 4.5 | 880 | 300 | 455 | 450 | 0.09 | 440 | 22 | 18 | EXAMPLE OF PRESENT INVENTION |
| 22 | 6 | −1.4 | 4.5 | 830 | 80 | 450 | 460 | 0.08 | 410 | 34 | 61 | EXAMPLE OF PRESENT INVENTION |
| 23 | 6 | −0.7 | 1.4 | 800 | 30 | 460 | 500 | 0.11 | 440 | 34 | 38 | EXAMPLE OF PRESENT INVENTION |
| 24 | 7 | −1.7 | 4 | 860 | 160 | 460 | 455 | 0.14 | 420 | 24 | 15 | EXAMPLE OF PRESENT INVENTION |
| 25 | 8 | −1.7 | 4.5 | 900 | 300 | 455 | 460 | 0.15 | 430 | 16 | 24 | EXAMPLE OF PRESENT INVENTION |
| 26 | 9 | −1.4 | 4.5 | 880 | 200 | 450 | 450 | 0.3 | 400 | 48 | 15 | EXAMPLE OF PRESENT INVENTION |
| 27 | 10 | −1.6 | 4 | 860 | 160 | 460 | 455 | 0.08 | 400 | 29 | 20 | EXAMPLE OF PRESENT INVENTION |
| 28 | 10 | −1.5 | 4.5 | 860 | 70 | 455 | 470 | 0.12 | 410 | 44 | 36 | EXAMPLE OF PRESENT INVENTION |

TABLE 2-continued

| | | ANNEALING CONDITION TEMPERATURE 650° C. to | | | | HOT-DIP GALVANIZED PLATING CONDITION | | | ALLOYING CONDITION | | RATIO WITH RESPECT TO | |
|---|---|---|---|---|---|---|---|---|---|---|---|---|
| | | | MAXIMUM HEATING TEMPERATURE | | | PLATING BATH | PLATING BATH | | | | | |
| EXPERIMENTAL RUN NUMBER | STEEL TYPE NUMBER | Log (PH2O/ PH2) | TEMPERATURE RISE RATE (° C./s) | MAXIMUM HEATING TEMPERATURE (° C) | ANNEALING TIME(s) | PLATING BATH TEMPERATURE (° C) | ENTERING TIME SHEET TEMPERATURE (° C) | EFFECTIVE Al CONCENTRATION (MASS %) | ALLOYING TEMPERATURE (° C) | ALLOYING TIME(s) | ALLOYING COMPLETION TIME (%) | REMARKS |
| 29 | 10 | −1 | 0.8 | 830 | 120 | 465 | 470 | 0.12 | 410 | 18 | 26 | EXAMPLE OF PRESENT INVENTION |
| 30 | 11 | −1.6 | 4.5 | 900 | 240 | 460 | 445 | 0.09 | 440 | 19 | 18 | EXAMPLE OF PRESENT INVENTION |
| 31 | 12 | −1.6 | 4.5 | 890 | 240 | 460 | 455 | 0.09 | 440 | 30 | 21 | EXAMPLE OF PRESENT INVENTION |
| 32 | 12 | −1.6 | 4 | 800 | 90 | 455 | 465 | 0.13 | 440 | 14 | 27 | EXAMPLE OF PRESENT INVENTION |
| 33 | 12 | −0.9 | 1.7 | 850 | 30 | 465 | 470 | 0.11 | 430 | 49 | 73 | EXAMPLE OF PRESENT INVENTION |
| 34 | 13 | −1.4 | 4 | 870 | 160 | 450 | 450 | 0.11 | 430 | 30 | 15 | COMPARATIVE EXAMPLE |

Steel sheets of respective examples manufactured through the aforementioned method were subjected to evaluation tests as described below, and results thereof were illustrated in Tables 3-1, 3-2.

TABLE 3-1

| | PLATING LAYER | | | | | | | | |
|---|---|---|---|---|---|---|---|---|---|
| | | | | | PROJECTING ALLOY LAYER | | | | |
| EXPERIMENTAL RUN NUMBER | PLATING ADHESION AMOUNT (g/m²) | Fe CONCENTRATION IN PLATING LAYER (MASS %) | Al CONCENTRATION IN PLATING LAYER (MASS %) | NUMBER DENSITY (pieces/ mm) | MAXIMUM LENGTH (μm) | KIND OF CONTAINED OXIDE | OXIDE MAXIMUM DIAMETER (μm) | OXIDE NUMBER DENSITY (pieces/ μm²) | PRESENCE/ ABSENCE OF PROJECTION OF ALLOY LAYER TO PLATING LAYER SURFACE |
| 1 | 67 | 0.9 | 0.169 | 4 | 50 | SiO2•Mn2SiO4•MnSiO3•MnO | 0.62 | 8 | ABSENT |
| 2 | 56 | 4.4 | 0.104 | 50 | 4 | SiO2•Mn2SiO4•MnSiO3•MnO | 0.16 | 69 | ABSENT |
| 3 | 43 | 6.2 | 0.255 | 60 | 9 | SiO2•Mn2SiO4•MnSiO3•MnO | 0.13 | 90 | ABSENT |
| 4 | 51 | 7.5 | 0.221 | 1 | 300 | ABSENT | — | — | PRESENT |
| 5 | 47 | 0.3 | 0.255 | 8 | 13 | SiO2•Mn2SiO4•MnSiO3•MnO | 0.56 | 5 | ABSENT |
| 6 | 66 | 5.3 | 0.2 | 58 | 10 | SiO2•Mn2SiO4•MnSiO3•MnO | 0.15 | 41 | ABSENT |
| 7 | 75 | 2 | 0.3 | 53 | 6 | SiO2•Mn2SiO4•MnSiO3•MnO | 0.4 | 55 | ABSENT |
| 8 | 76 | 6.7 | 0.6 | 5 | 10 | SiO2•Mn2SiO4•MnSiO3•MnO | 1.1 | 1 | ABSENT |
| 9 | 81 | 0.6 | 0.21 | 7 | 10 | SiO2•Mn2SiO4 | 0.63 | 15 | ABSENT |
| 10 | 51 | 4.1 | 0.104 | 54 | 16 | SiO2•Mn2SiO4 | 0.19 | 55 | ABSENT |
| 11 | 63 | 4.4 | 0.117 | 18 | 7 | SiO2•Mn2SiO4 | 0.28 | 65 | ABSENT |
| 12 | 78 | 0.9 | 0.17 | 5 | 13 | SiO2•Mn2SiO4•MnSiO3•MnO | 0.48 | 11 | ABSENT |
| 13 | 46 | 6.5 | 0.26 | 42 | 9 | SiO2•Mn2SiO4•MnSiO3•MnO | 0.25 | 35 | ABSENT |
| 14 | 53 | 1.2 | 0.48 | 12 | 5 | SiO2•Mn2SiO4•MnSiO3•MnO | 0.1 | 43 | ABSENT |
| 15 | 55 | 3.5 | 0.46 | 34 | 9 | SiO2•Mn2SiO4•MnSiO3•MnO | 0.19 | 85 | ABSENT |

TABLE 3-1-continued

<table>
<thead>
<tr><th colspan="11">PLATING LAYER</th></tr>
<tr><th></th><th></th><th></th><th></th><th colspan="7">PROJECTING ALLOY LAYER</th></tr>
<tr><th>EXPERIMENTAL RUN NUMBER</th><th>PLATING ADHESION AMOUNT (g/m$^2$)</th><th>Fe CONCENTRATION IN PLATING LAYER (MASS %)</th><th>Al CONCENTRATION IN PLATING LAYER (MASS %)</th><th>NUMBER DENSITY (pieces/mm)</th><th>MAXIMUM LENGTH (μm)</th><th>KIND OF CONTAINED OXIDE</th><th>OXIDE MAXIMUM DIAMETER (μm)</th><th>OXIDE NUMBER DENSITY (pieces/μm$^2$)</th><th>PRESENCE/ABSENCE OF PROJECTION OF ALLOY LAYER TO PLATING LAYER SURFACE</th></tr>
</thead>
<tbody>
<tr><td>16</td><td>57</td><td>9.3</td><td>0.49</td><td>ABSENT</td><td>—</td><td>—</td><td>—</td><td>—</td><td>PRESENT</td></tr>
<tr><td>17</td><td>79</td><td>1.1</td><td>0.204</td><td>9</td><td>10</td><td>SiO2•Mn2SiO4•MnSiO3•MnO</td><td>0.41</td><td>9</td><td>ABSENT</td></tr>
<tr><td>18</td><td>92</td><td>2.3</td><td>0.26</td><td>14</td><td>12</td><td>SiO2•Mn2SiO4•MnSiO3•MnO</td><td>0.05</td><td>27</td><td>ABSENT</td></tr>
<tr><td>19</td><td>87</td><td>2.6</td><td>0.195</td><td>30</td><td>6</td><td>SiO2•Mn2SiO4•MnSiO3•MnO</td><td>0.27</td><td>50</td><td>ABSENT</td></tr>
<tr><td>20</td><td>85</td><td>12.6</td><td>0.165</td><td>ABSENT</td><td>—</td><td>—</td><td>—</td><td>—</td><td>PRESENT</td></tr>
<tr><td>21</td><td>91</td><td>1.1</td><td>0.18</td><td>7</td><td>100</td><td>SiO2•Mn2SiO4</td><td>0.44</td><td>6</td><td>ABSENT</td></tr>
<tr><td>22</td><td>71</td><td>5.3</td><td>0.136</td><td>46</td><td>7</td><td>SiO2•Mn2SiO4</td><td>0.23</td><td>40</td><td>ABSENT</td></tr>
<tr><td>23</td><td>39</td><td>2.8</td><td>0.165</td><td>46</td><td>16</td><td>SiO2•Mn2SiO4</td><td>0.22</td><td>34</td><td>ABSENT</td></tr>
<tr><td>24</td><td>64</td><td>0.3</td><td>0.21</td><td>5</td><td>12</td><td>SiO2•Mn2SiO4•MnSiO3•MnO</td><td>0.65</td><td>12</td><td>ABSENT</td></tr>
<tr><td>25</td><td>43</td><td>1.9</td><td>0.225</td><td>5</td><td>12</td><td>SiO2•Mn2SiO4•MnSiO3•MnO</td><td>0.53</td><td>17</td><td>ABSENT</td></tr>
<tr><td>26</td><td>71</td><td>1.2</td><td>0.45</td><td>8</td><td>16</td><td>SiO2•Mn2SiO4•MnSiO3•MnO</td><td>0.68</td><td>14</td><td>ABSENT</td></tr>
<tr><td>27</td><td>86</td><td>1.5</td><td>0.16</td><td>4</td><td>3</td><td>SiO2•Mn2SiO4•MnSiO3•MnO</td><td>0.68</td><td>18</td><td>ABSENT</td></tr>
<tr><td>28</td><td>91</td><td>2.9</td><td>0.204</td><td>26</td><td>4</td><td>SiO2•Mn2SiO4•MnSiO3•MnO</td><td>0.19</td><td>45</td><td>ABSENT</td></tr>
<tr><td>29</td><td>59</td><td>2.1</td><td>0.18</td><td>38</td><td>3</td><td>SiO2•Mn2SiO4•MnSiO3•MnO</td><td>0.23</td><td>70</td><td>ABSENT</td></tr>
<tr><td>30</td><td>83</td><td>0.7</td><td>0.18</td><td>9</td><td>7</td><td>SiO2•Mn2SiO4•MnSiO3•MnO</td><td>0.53</td><td>1</td><td>ABSENT</td></tr>
<tr><td>31</td><td>50</td><td>1.7</td><td>0.117</td><td>7</td><td>6</td><td>SiO2•Mn2SiO4•MnSiO3•MnO</td><td>0.58</td><td>19</td><td>ABSENT</td></tr>
<tr><td>32</td><td>51</td><td>2.1</td><td>0.221</td><td>22</td><td>4</td><td>SiO2•Mn2SiO4•MnSiO3•MnO</td><td>0.25</td><td>90</td><td>ABSENT</td></tr>
<tr><td>33</td><td>71</td><td>6.3</td><td>0.165</td><td>18</td><td>3</td><td>SiO2•Mn2SiO4•MnSiO3•MnO</td><td>0.19</td><td>76</td><td>ABSENT</td></tr>
<tr><td>34</td><td>67</td><td>0.03</td><td>0.187</td><td colspan="7">UNPLATING OCCURRED</td></tr>
</tbody>
</table>

TABLE 3-2

<table>
<thead>
<tr><th></th><th colspan="5">STEEL BASE MATERIAL</th><th colspan="4"></th></tr>
<tr><th></th><th colspan="5">MINIATURIZED LAYER</th><th colspan="4">DECARBURIZED LAYER</th></tr>
<tr><th>EXPERIMENTAL RUN NUMBER</th><th>AVERAGE THICKNESS (μm)</th><th>FERRITE PHASE AVERAGE GRAIN DIAMETER (μm)</th><th>KIND OF CONTAINED OXIDE</th><th>OXIDE MAXIMUM DIAMETER (μm)</th><th>OXIDE NUMBER DENSITY (peices/μm2)</th><th>AVERAGE THICKNESS (μm)</th><th>FERRITE PHASE AVERAGE GRAIN DIAMETER (μm)</th><th>FERRITE PHASE VOLUME FRACTION (%)</th></tr>
</thead>
<tbody>
<tr><td>1</td><td>4.9</td><td>2.7</td><td>SiO2•Mn2SiO4•MnSiO3•MnO</td><td>0.46</td><td>13</td><td>21</td><td>14</td><td>86</td></tr>
<tr><td>2</td><td>3.1</td><td>2.4</td><td>SiO2•Mn2SiO4•MnSiO3•MnO</td><td>0.39</td><td>5</td><td>19</td><td>6</td><td>79</td></tr>
<tr><td>3</td><td>0.7</td><td>1</td><td>SiO2•Mn2SiO4•MnSiO3•MnO</td><td>0.08</td><td>67</td><td>66</td><td>23</td><td>87</td></tr>
<tr><td>4</td><td>1</td><td>0.7</td><td>SiO2•Mn2SiO4•MnSiO3•MnO</td><td>0.17</td><td>81</td><td>45</td><td>20</td><td>71</td></tr>
<tr><td>5</td><td>4.6</td><td>2.6</td><td>SiO2•Mn2SiO4•MnSiO3•MnO</td><td>0.4</td><td>10</td><td>13</td><td>6</td><td>70</td></tr>
<tr><td>6</td><td>3.7</td><td>2.1</td><td>SiO2•Mn2SiO4•MnSiO3•MnO</td><td>0.27</td><td>17</td><td>22</td><td>28</td><td>78</td></tr>
<tr><td>7</td><td>1.2</td><td>1.1</td><td>SiO2•Mn2SiO4•MnSiO3•MnO</td><td>0.01</td><td>43</td><td>52</td><td>18</td><td>80</td></tr>
<tr><td>8</td><td>ABSENT</td><td>—</td><td>—</td><td>—</td><td>—</td><td>ABSENT</td><td>—</td><td>—</td></tr>
<tr><td>9</td><td>4.5</td><td>2.2</td><td>SiO2•Mn2SiO4</td><td>0.31</td><td>19</td><td>23</td><td>20</td><td>97</td></tr>
<tr><td>10</td><td>3.4</td><td>2.5</td><td>SiO2•Mn2SiO4</td><td>0.21</td><td>7</td><td>29</td><td>24</td><td>96</td></tr>
<tr><td>11</td><td>0.4</td><td>1.9</td><td>SiO2•Mn2SiO4</td><td>0.04</td><td>92</td><td>31</td><td>11</td><td>77</td></tr>
<tr><td>12</td><td>4.3</td><td>2.9</td><td>SiO2•Mn2SiO4•MnSiO3•MnO</td><td>0.24</td><td>16</td><td>16</td><td>12</td><td>99</td></tr>
<tr><td>13</td><td>3.9</td><td>2.9</td><td>SiO2•Mn2SiO4•MnSiO3•MnO</td><td>0.42</td><td>2</td><td>25</td><td>13</td><td>98</td></tr>
<tr><td>14</td><td>1.4</td><td>1.7</td><td>SiO2•Mn2SiO4•MnSiO3•MnO</td><td>0.13</td><td>65</td><td>57</td><td>26</td><td>66</td></tr>
<tr><td>15</td><td>1.5</td><td>1.8</td><td>SiO2•Mn2SiO4•MnSiO3•MnO</td><td>0.16</td><td>60</td><td>62</td><td>27</td><td>72</td></tr>
<tr><td>16</td><td>1.6</td><td>2</td><td>SiO2•Mn2SiO4•MnSiO3•MnO</td><td>0.14</td><td>53</td><td>59</td><td>29</td><td>74</td></tr>
<tr><td>17</td><td>4.3</td><td>2.6</td><td>SiO2•Mn2SiO4•MnSiO3•MnO</td><td>0.49</td><td>8</td><td>25</td><td>20</td><td>91</td></tr>
<tr><td>18</td><td>4.9</td><td>3</td><td>SiO2•Mn2SiO4•MnSiO3•MnO</td><td>0.33</td><td>1</td><td>17</td><td>17</td><td>85</td></tr>
<tr><td>19</td><td>1.8</td><td>1.7</td><td>SiO2•Mn2SiO4•MnSiO3•MnO</td><td>0.1</td><td>29</td><td>38</td><td>26</td><td>93</td></tr>
<tr><td>20</td><td>1</td><td>1.3</td><td>SiO2•Mn2SiO4•MnSiO3•MnO</td><td>0.13</td><td>39</td><td>101</td><td>27</td><td>94</td></tr>
<tr><td>21</td><td>3.7</td><td>2.4</td><td>SiO2•Mn2SiO4</td><td>0.45</td><td>11</td><td>10</td><td>8</td><td>92</td></tr>
<tr><td>22</td><td>3.5</td><td>2.5</td><td>SiO2•Mn2SiO4</td><td>0.3</td><td>4</td><td>11</td><td>26</td><td>82</td></tr>
<tr><td>23</td><td>1.9</td><td>1.4</td><td>SiO2•Mn2SiO4</td><td>0.11</td><td>85</td><td>87</td><td>14</td><td>88</td></tr>
<tr><td>24</td><td>4.7</td><td>2.1</td><td>SiO2•Mn2SiO4•MnSiO3•MnO</td><td>0.43</td><td>10</td><td>13</td><td>30</td><td>90</td></tr>
<tr><td>25</td><td>3.1</td><td>2.7</td><td>SiO2•Mn2SiO4•MnSiO3•MnO</td><td>0.22</td><td>14</td><td>28</td><td>30</td><td>72</td></tr>
<tr><td>26</td><td>4</td><td>2.3</td><td>SiO2•Mn2SiO4•MnSiO3•MnO</td><td>0.36</td><td>2</td><td>15</td><td>8</td><td>75</td></tr>
<tr><td>27</td><td>3.3</td><td>3</td><td>SiO2•Mn2SiO4•MnSiO3•MnO</td><td>0.48</td><td>6</td><td>27</td><td>16</td><td>83</td></tr>
</tbody>
</table>

TABLE 3-2-continued

| | | | | | | | | |
|---|---|---|---|---|---|---|---|---|
| 28 | 4.1 | 2 | SiO2•Mn2SiO4•MnSiO3•MnO | 0.34 | 15 | 19 | 5 | 76 |
| 29 | 0.6 | 0.5 | SiO2•Mn2SiO4•MnSiO3•MnO | 0.2 | 22 | 136 | 10 | 88 |
| 30 | 4.3 | 2.3 | SiO2•Mn2SiO4•MnSiO3•MnO | 0.25 | 4 | 15 | 22 | 73 |
| 31 | 3.2 | 2.8 | SiO2•Mn2SiO4•MnSiO3•MnO | 0.28 | 16 | 22 | 9 | 83 |
| 32 | 3.7 | 2.2 | SiO2•Mn2SiO4•MnSiO3•MnO | 0.37 | 7 | 27 | 15 | 95 |
| 33 | 0.2 | 1.6 | SiO2•Mn2SiO4•MnSiO3•MnO | 0.05 | 46 | 108 | 26 | 91 |
| 34 | 1.3 | 2.2 | SiO2•Mn2SiO4•MnSiO3•MnO | 0.5 | 11 | 30 | 20 | 76 |

| EXPERIMENTAL RUN NUMBER | STEEL BASE MATERIAL DECARBURIZED LAYER | | EVALUATION RESULT | | | OT BENDING WORKED PORTION | REMARKS |
|---|---|---|---|---|---|---|---|
| | KIND OF CONTAINED OXIDE | Hv (surf)/ Hv (bulk) | TENSILE STRENGTH (MPa) | V BENDING | BALL IMPACT | CORROSION RESISTANCE | |
| 1 | SiO2•Mn2SiO4•MnSiO3•MnO | 0.75 | 1190 | ○ | ○ | ○ | EXAMPLE OF PRESENT INVENTION |
| 2 | SiO2•Mn2SiO4•MnSiO3•MnO | 0.7 | 1210 | ○ | ◎ | ◎ | EXAMPLE OF PRESENT INVENTION |
| 3 | SiO2•Mn2SiO4•MnSiO3•MnO | 0.65 | 1200 | ○ | ◎◎ | ◎◎ | EXAMPLE OF PRESENT INVENTION |
| 4 | SiO2•Mn2SiO4•MnSiO3•MnO | 0.37 | 1170 | X | X | X | COMPARATIVE EXAMPLE |
| 5 | SiO2•Mn2SiO4•MnSiO3•MnO | 0.74 | 1250 | ○ | ○ | ○ | EXAMPLE OF PRESENT INVENTION |
| 6 | SiO2•Mn2SiO4•MnSiO3•MnO | 0.71 | 1230 | ○ | ◎ | ◎ | EXAMPLE OF PRESENT INVENTION |
| 7 | SiO2•Mn2SiO4•MnSiO3•MnO | 0.52 | 1150 | ○ | ◎◎ | ◎◎ | EXAMPLE OF PRESENT INVENTION |
| 8 | — | — | 1210 | Δ | Δ | X | COMPARATIVE EXAMPLE |
| 9 | SiO2•Mn2SiO4 | 0.68 | 1170 | ○ | ○ | ○ | EXAMPLE OF PRESENT INVENTION |
| 10 | SiO2•Mn2SiO4 | 0.77 | 1150 | ○ | ◎ | ◎ | EXAMPLE OF PRESENT INVENTION |
| 11 | SiO2•Mn2SiO4 | 0.46 | 1240 | ○ | ◎◎ | ◎◎ | EXAMPLE OF PRESENT INVENTION |
| 12 | SiO2•Mn2SiO4•MnSiO3•MnO | 0.75 | 1010 | ○ | ○ | ○ | EXAMPLE OF PRESENT INVENTION |
| 13 | SiO2•Mn2SiO4•MnSiO3•MnO | 0.62 | 1050 | ○ | ◎ | ◎ | EXAMPLE OF PRESENT INVENTION |
| 14 | SiO2•Mn2SiO4•MnSiO3•MnO | 0.47 | 960 | ○ | ◎◎ | ◎◎ | EXAMPLE OF PRESENT INVENTION |
| 15 | SiO2•Mn2SiO4•MnSiO3•MnO | 0.52 | 1000 | ○ | ◎◎ | ◎◎ | EXAMPLE OF PRESENT INVENTION |
| 16 | SiO2•Mn2SiO4•MnSiO3•MnO | 0.49 | 990 | X | Δ | X | COMPARATIVE EXAMPLE |
| 17 | SiO2•Mn2SiO4•MnSiO3•MnO | 0.79 | 630 | ○ | ○ | ○ | EXAMPLE OF PRESENT INVENTION |
| 18 | SiO2•Mn2SiO4•MnSiO3•MnO | 0.78 | 610 | ○ | ◎ | ◎ | EXAMPLE OF PRESENT INVENTION |
| 19 | SiO2•Mn2SiO4•MnSiO3•MnO | 0.31 | 650 | ○ | ◎◎ | ◎◎ | EXAMPLE OF PRESENT INVENTION |
| 20 | SiO2•Mn2SiO4•MnSiO3•MnO | 0.3 | 600 | X | X | X | COMPARATIVE EXAMPLE |
| 21 | SiO2•Mn2SiO4 | 0.74 | 990 | ○ | ○ | ○ | EXAMPLE OF PRESENT INVENTION |
| 22 | SiO2•Mn2SiO4 | 0.61 | 1040 | ○ | ◎ | ◎ | EXAMPLE OF PRESENT INVENTION |
| 23 | SiO2•Mn2SiO4 | 0.44 | 1100 | ○ | ◎◎ | ◎◎ | EXAMPLE OF PRESENT INVENTION |
| 24 | SiO2•Mn2SiO4•MnSiO3•MnO | 0.66 | 1010 | ○ | ○ | ○ | EXAMPLE OF PRESENT INVENTION |
| 25 | SiO2•Mn2SiO4•MnSiO3•MnO | 0.8 | 1290 | ○ | ○ | ○ | EXAMPLE OF PRESENT INVENTION |
| 26 | SiO2•Mn2SiO4•MnSiO3•MnO | 0.7 | 600 | ○ | ○ | ○ | EXAMPLE OF PRESENT INVENTION |
| 27 | SiO2•Mn2SiO4•MnSiO3•MnO | 0.77 | 680 | ○ | ○ | ○ | EXAMPLE OF PRESENT INVENTION |
| 28 | SiO2•Mn2SiO4•MnSiO3•MnO | 0.66 | 710 | ○ | ◎ | ◎ | EXAMPLE OF PRESENT INVENTION |
| 29 | SiO2•Mn2SiO4•MnSiO3•MnO | 0.4 | 690 | ○ | ◎◎ | ◎◎ | EXAMPLE OF PRESENT INVENTION |
| 30 | SiO2•Mn2SiO4•MnSiO3•MnO | 0.73 | 1480 | ○ | ○ | ○ | EXAMPLE OF PRESENT INVENTION |
| 31 | SiO2•Mn2SiO4•MnSiO3•MnO | 0.64 | 1360 | ○ | ○ | ○ | EXAMPLE OF PRESENT INVENTION |

TABLE 3-2-continued

| 32 | SiO2•Mn2SiO4•MnSiO3•MnO | 0.78 | 1390 | ○ | ⊚ | ⊚ | EXAMPLE OF PRESENT INVENTION |
|---|---|---|---|---|---|---|---|
| 33 | SiO2•Mn2SiO4•MnSiO3•MnO | 0.37 | 1410 | ○ | ⊚⊚ | ⊚⊚ | EXAMPLE OF PRESENT INVENTION |
| 34 | SiO2•Mn2SiO4•MnSiO3•MnO | 0.65 | 1340 | X | X | X | COMPARATIVE EXAMPLE |

An adhesion amount of the plating layer was found through a gravimetric method by melting the plating layer on an evaluation surface in hydrochloric acid with inhibitor. At the same time, Fe and Al in the molten liquid were quantified through ICP to measure the Fe concentration and the Al concentration in the plating layer.

As described above, the maximum length and the number density of the projecting alloy layers in the plating layer were found by embedding the cross section and performing mirror-polishing, immersing into a 0.5 mass % nital etchant for 1 to 3 seconds to perform etching, and observing by using an optical microscope at a magnification of 200 times.

As described above, the average thickness of the miniaturized layer of the steel sheet base material, and the average grain size of the ferrite phase in the miniaturized layer were measured by performing the CP process of the cross-section, the reflected electron image obtained by the FE-SEM was observed at the magnification of 5000 times.

As described above, the average thickness of the decarburized layer of the steel sheet base material was found by performing the mirror-polishing after the cross section was embedded, measuring the hardness curve by using micro Vickers from the interface between the steel sheet base material and the plating layer toward the steel sheet base material side, and subtracting the thickness of the miniaturized layer found in advance from the thickness of the layer whose hardness is lowered with respect to the hardness of the inner layer.

As described above, the average grain size of the ferrite phase in the decarburized layer and the average volume fraction of the ferrite phase at the decarburized layer were found by performing 3% nital etching after the cross-section is embedded and polished, and observing a secondary electron image of the FE-SEM at the magnification of 2000 times at the decarburized layer.

As described above, the Hv (surf)/Hv (bulk) was found by performing the cross-section embedding and polishing, and then measuring the average value of the micro Vickers hardness of the decarburized layer Hv (surf) and the average value of the micro Vickers hardness of the inner layer Hv (bulk), and calculating the ratio thereof.

As described above, the presence/absence, the kind, the maximum diameter, and the number density of oxides at each of the projecting alloy layers, the miniaturized layer, and the decarburized layer were found by fabricating the thin film sample by performing the FIB process of the cross-section of the plated steel sheet, then observing the sample by using the FE-TEM at the magnification of 30000 times.

Regarding tensile strength in a tensile test, No. 5 test pieces according to JIS Z 2201 were processed from the steel sheets of respective examples, and each tensile strength (MPa) was measured according to the test method described in JIS Z 2241.

The plating adhesiveness assuming a standard process was evaluated by a V-bending test. A 60° V-bending mold was used for the V-bending test. The steel sheet was bent 60° such that an evaluation surface turned to a bending inner side by using a mold having a curvature radius at a tip of 1 mm, a tape was adhered on a bent part inner side, and then the tape was peeled off A powdering property was evaluated from a peeling state of the plating layer which was peeled off together with the tape. It was evaluated as ○: without peeling, Δ: with peeling, and x: with remarkable peeling, and ○ was evaluated as passed.

The plating adhesiveness assuming when the steel sheet receives impact, and at hard working time was evaluated by a ball impact test. In the ball impact test, a mold having a hemispherical tip part with a diameter of 25 mm and with a weight of 3.2 kg was dropped on the hot-dip galvanized steel sheet from a height of 60 cm, and a projecting part of the deformed hot-dip galvanized steel sheet was observed with a loupe and peeled with a tape to be evaluated. It was evaluated as ⊚ ⊚: without peeling and cracks, ⊚: minute cracks locally exist but no problem, ○: minute cracks and peeling locally exist but no problem, Δ: large peeling exists and there is a problem, and x: remarkable peeling exists and there is a problem, and ⊚ ⊚, ⊚, ○ are evaluated as passed.

The worked portion corrosion resistance at the portion being subjected to extremely severe working was checked by using a sample after a 0T bending (180° close-contact bending) test. A bent outside vertex part of the 0T bending was set as an evaluation portion, and the sample after the 0T bending was subjected to the conversion treatment and the electrodeposition coating under the following conditions.

Conversion treatment: Zinc phosphate treatment, adhesion amount of 2.5 g/m$^2$

Electrodeposition coating: Pb-free epoxy-based electrodeposition paint, film thickness of 20 μm After that, an accelerated corrosion test described in JASO-M609-91 was performed, to evaluate the number of cycles where red rust was generated from the 0T bent vertex part. Results were evaluated based on the following criteria, and ⊚ ⊚, ⊚, ○ were evaluated as passed. ⊚ ⊚: red rust, white rust are not generated after 150 cycles have passed, ⊚: without red rust and slight white rust is generated after 150 cycles have passed, ○: without red rust and slight white rust is generated after 120 cycles have passed, Δ: red rust is generated after 60 cycles, and x: red rust is generated after 30 cycles.

In all of the examples of this invention, the plating adhesiveness at the hard working time and the worked portion corrosion resistance at the hard working time are at an acceptable level as it can be seen from Table 3. In all of the comparative examples which do not satisfy the scope of the present invention, the plating adhesiveness at the hard working time and the worked portion corrosion resistance at the hard working time are deteriorated. FIG. 2 illustrates a cross-sectional photograph of an inner layer of the comparative example which is estimated to correspond to Experimental run number 8, and a cross-sectional photograph of an inner layer of the example of this invention which is estimated to correspond to Experimental run number 13.

EXPLANATION OF CODES 1 plating layer
2 projecting alloy layer 3 measuring direction of diameter of projecting alloy layer
4 steel sheet base material
5 miniaturized layer
6 decarburized layer
7 inner layer
8 ferrite phase
9 remaining structure (any of austenite phase, bainite phase, martensite phase, pearlite phase)

What is claimed is:

1. A high-strength hot-dip galvanized steel sheet excellent in impact resistance and worked portion corrosion resistance, comprising a hot-dip galvanized plating layer containing Fe: 0.01 to 6.9 mass %, Al: 0.01 to 1.0 mass %, with a balance made up of Zn and inevitable impurities on a steel sheet base material containing, C: 0.05 to 0.4 mass %,
Si: 0.4 to 3.0 mass %,
Mn: 1.0 to 4.0 mass %,
P: 0.0001 to 0.1 mass %,
S: 0.0001 to 0.01 mass %,
Al: 0.005 to 0.1 mass %,
N: 0.0005 to 0.01 mass %, and
O: 0.0001 to 0.01 mass %, with a balance made up of Fe and inevitable impurities, and having a tensile strength of 590 MPa or more, wherein:
the hot-dip galvanized plating layer includes projecting alloy layers which are in contact with the steel sheet base material and have a thickness of 2 μm or more, where the Fe—Al phase is not formed, a number density of the projecting alloy layers is 4 pieces/mm or more of an interface between the steel sheet base material and the plating layer when seen from a sectional direction, and a maximum diameter of the projecting alloy layers at the interface is 100 μm or less, wherein
the steel sheet base material includes:
a miniaturized layer which is directly in contact with the interface between the steel sheet base material and the plating layer and which thickness is measured by observing a cross-section of the steel sheet base material;
a decarburized layer which is in contact with the miniaturized layer and exists on an inward side of the steel sheet base material and has a mixed structure where a ferrite phase is a main body, and remaining structures are occupied by one or more kinds from among the austenite phase, the bainite phase, the martensite phase, and the pearlite phase; and
an inner layer other than the miniaturized layer and the decarburized layer, wherein
an average thickness of the miniaturized layer is 0.1 to 5 μm, and an average grain diameter of a ferrite phase in the miniaturized layer is 0.1 to 3 μm,
an average thickness of the decarburized layer is 10 to 200 μm, an average grain diameter of a ferrite phase in the decarburized layer is 5 to 30 μm, an average volume fraction of the ferrite phase in the decarburized layer is 70% or more, and a remaining structure is made up of austenite, bainite, martensite, or pearlite,
a ratio Hv (surf)/Hv (bulk) between an average Vickers hardness of the decarburized layer Hv (surf) and an average Vickers hardness of the inner layer Hv (bulk) is 0.3 to 0.8, where the Hv (surf) and Hv (bulk) are measured with a same load, and
one kind or two kinds or more of oxides of Si and Mn are contained in layers of the miniaturized layer, the decarburized layer, and the projecting alloy layers.

2. The high-strength hot-dip galvanized steel sheet excellent in impact resistance and worked portion corrosion resistance according to claim 1, wherein the oxides contained in the layers of the miniaturized layer, the decarburized layer, and the projecting alloy layers are one kind or two kinds or more from among $SiO_2$, $Mn_2SiO_4$, $MnSiO_3$, $Fe_2SiO_4$, $FeSiO_3$, and MnO.

3. The high-strength hot-dip galvanized steel sheet excellent in impact resistance and worked portion corrosion resistance according to claim 1, wherein
a maximum diameter of the oxides contained in the projecting alloy layers is 0.05 to 0.4 μm, and a number density is 20 to 100 pieces/μm$^2$ when seen from a vertical sectional direction.

4. The high-strength hot-dip galvanized steel sheet excellent in impact resistance and worked portion corrosion resistance according to claim 1, wherein a maximum diameter of the oxides contained in the miniaturized layer is 0.01 to 0.2 μm, and a number density is 20 to 100 pieces/μm$^2$ when seen from a vertical sectional direction.

5. The high-strength hot-dip galvanized steel sheet excellent in impact resistance and worked portion corrosion resistance according to claim 1, wherein the projecting alloy layers do not exist at an uppermost surface of the hot-dip galvanized plating layer.

6. The high-strength hot-dip galvanized steel sheet excellent in impact resistance and worked portion corrosion resistance according to claim 1, wherein the steel sheet base material further contains one kind or two kinds of:
Ti: 0.001 to 0.15 mass %, and
Nb: 0.001 to 0.10 mass %.

7. The high-strength hot-dip galvanized steel sheet excellent in impact resistance and worked portion corrosion resistance according to claim 6, wherein the steel sheet base material further contains one kind or two kinds or more of:
Mo: 0.01 to 2.0 mass %,
Cr: 0.01 to 2.0 mass %,
Ni: 0.01 to 2.0 mass %,
Cu: 0.01 to 2.0 mass %, and
B: 0.0001 to 0.01 mass %.

8. The high-strength hot-dip galvanized steel sheet excellent in impact resistance and worked portion corrosion resistance according to claim 1, wherein the steel sheet base material further contains one kind or two kinds or more of:
Mo: 0.01 to 2.0 mass %,
Cr: 0.01 to 2.0 mass %,
Ni: 0.01 to 2.0 mass %,
Cu: 0.01 to 2.0 mass %, and
B: 0.0001 to 0.01 mass %.

* * * * *